H. HULL.
SELECTIVE SIGNALING APPARATUS.
APPLICATION FILED JUNE 25, 1914. RENEWED NOV. 30, 1918.

1,318,670.

Patented Oct. 14, 1919.
9 SHEETS—SHEET 2.

Horace Hull

H. HULL.
SELECTIVE SIGNALING APPARATUS.
APPLICATION FILED JUNE 25, 1914. RENEWED NOV. 30, 1918.
1,318,670.
Patented Oct. 14, 1919.
9 SHEETS—SHEET 3.
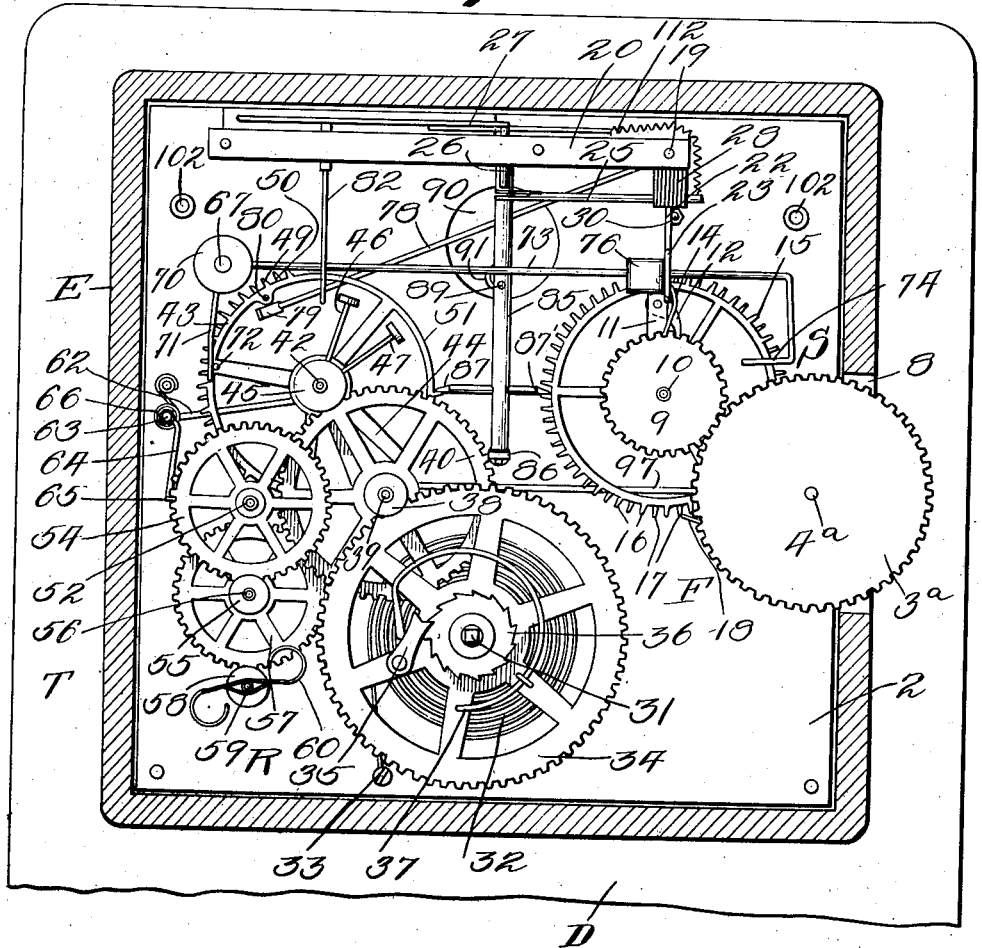
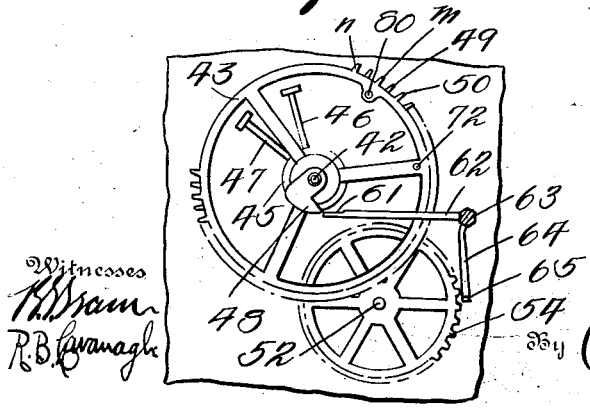
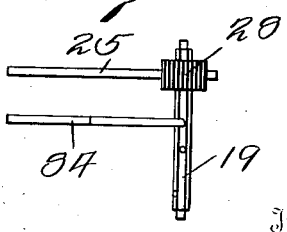
Inventor
Horace Hull
Witnesses
Attorneys

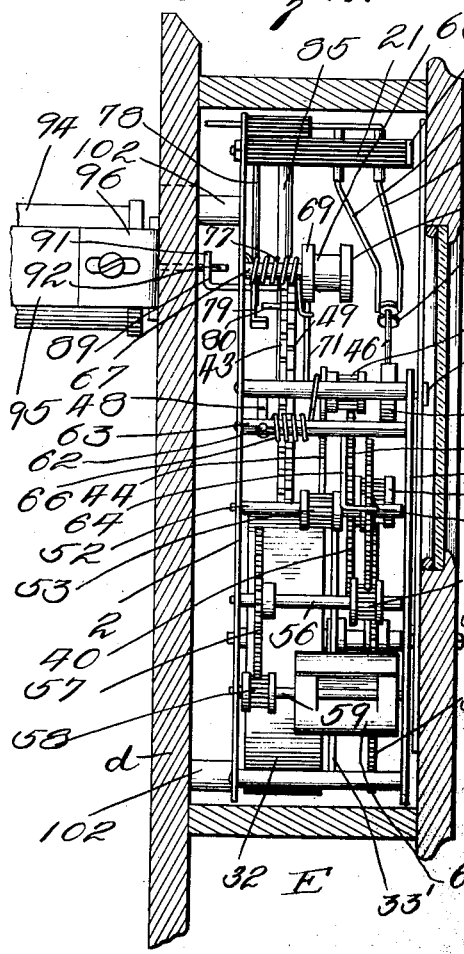

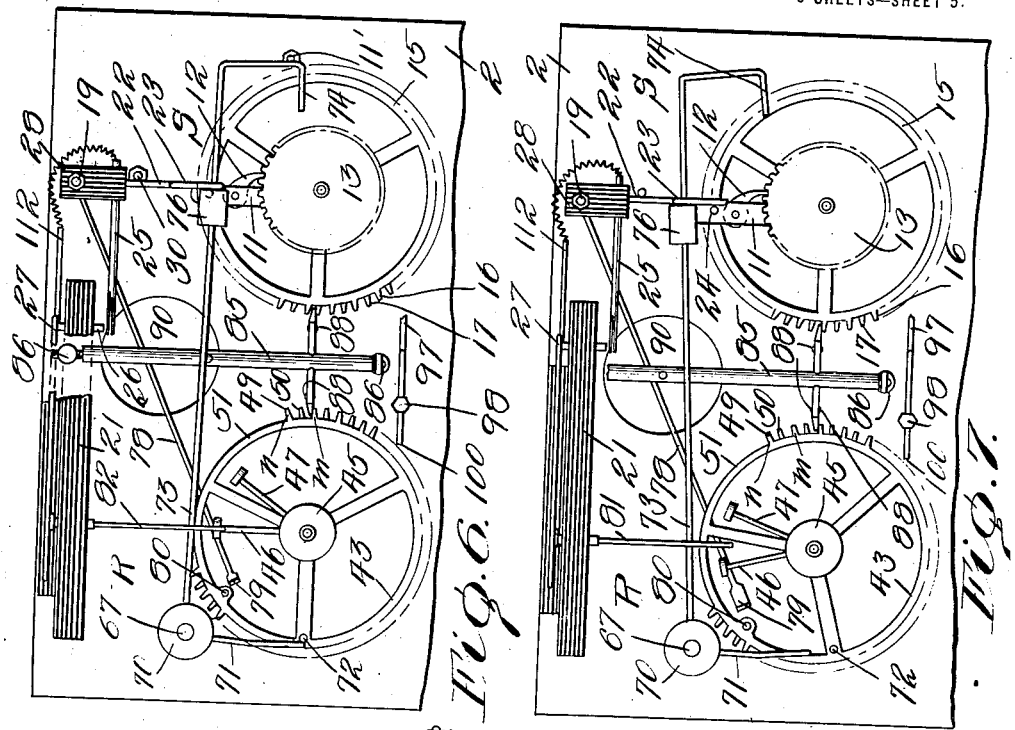
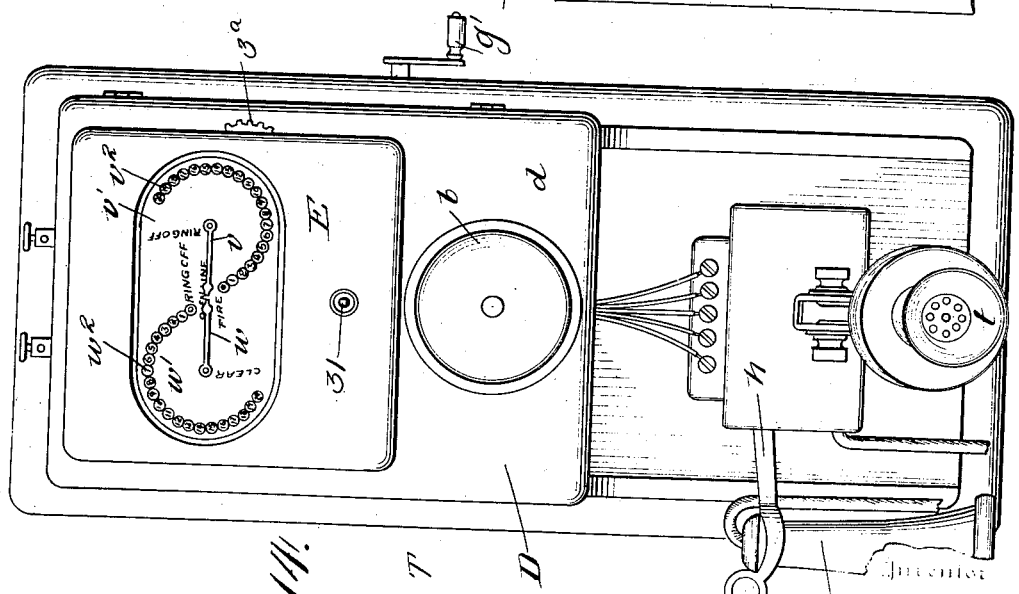

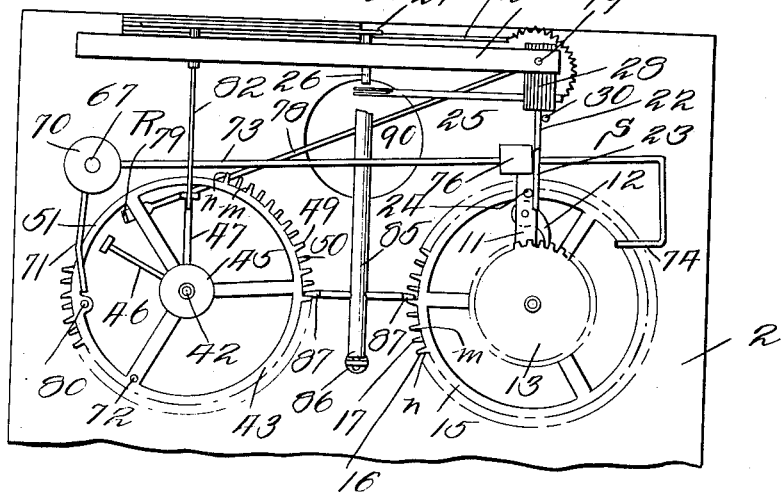

H. HULL.
SELECTIVE SIGNALING APPARATUS.
APPLICATION FILED JUNE 25, 1914. RENEWED NOV. 30, 1918.

1,318,670. Patented Oct. 14, 1919.
9 SHEETS—SHEET 7.

H. HULL.
SELECTIVE SIGNALING APPARATUS.
APPLICATION FILED JUNE 25, 1914. RENEWED NOV. 30, 1918.

1,318,670.

Patented Oct. 14, 1919.
9 SHEETS—SHEET 8.

H. HULL.
SELECTIVE SIGNALING APPARATUS.
APPLICATION FILED JUNE 25, 1914. RENEWED NOV. 30, 1918.
1,318,670. Patented Oct. 14, 1919.
9 SHEETS—SHEET 9.
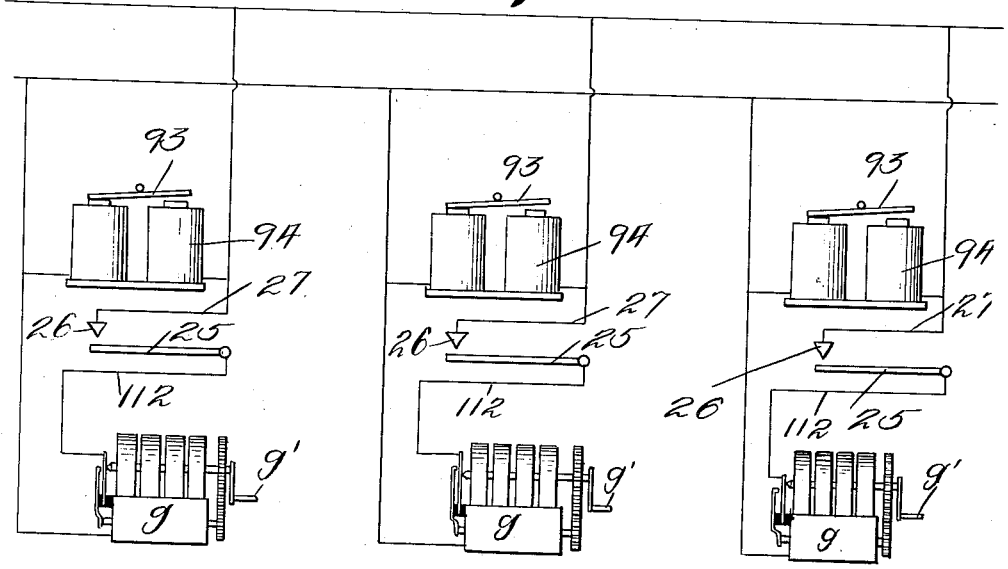
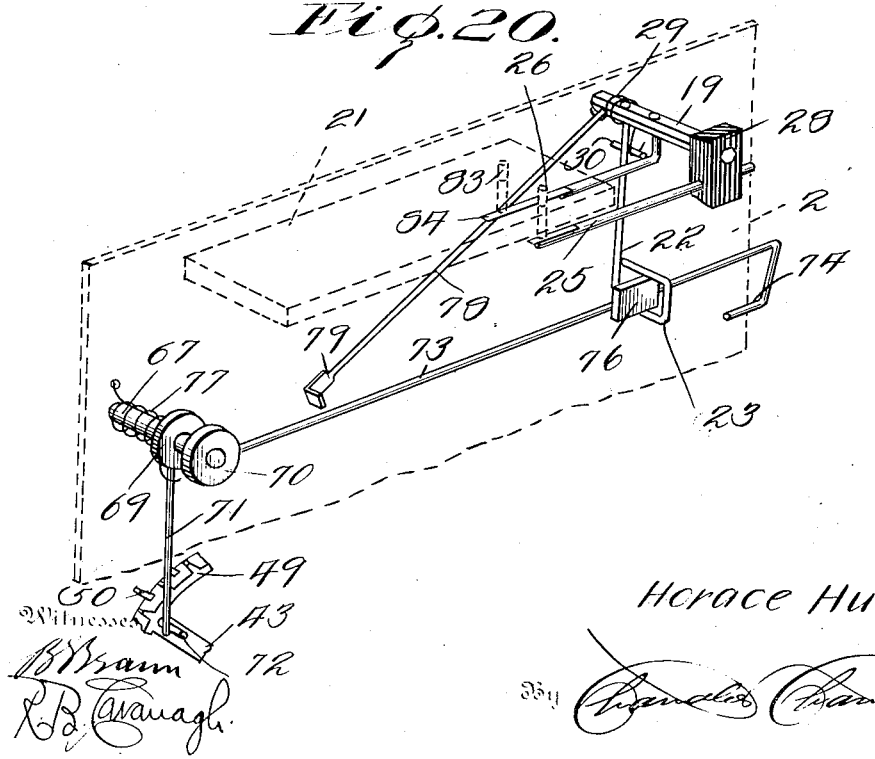
Inventor
Horace Hull

UNITED STATES PATENT OFFICE.

HORACE HULL, OF DENVER, COLORADO.

SELECTIVE SIGNALING APPARATUS.

1,318,670. Specification of Letters Patent. Patented Oct. 14, 1919.

Application filed June 25, 1914, Serial No. 847,272. Renewed November 30, 1918. Serial No. 264,862.

*To all whom it may concern:*

Be it known that I, HORACE HULL, a citizen of the United States, residing at Denver, in the county of Denver, State of Colorado, have invented certain new and useful Improvements in Selective Signaling Apparatus; and I do hereby declare the following to be a full, clear, and exact description of the invention, such as will enable others skilled in the art to which it appertains to make and use the same.

This invention relates to signaling apparatus, and while I have in the present instance illustrated and described my invention as embodied in its preferred form, that is to say in a selective telephone system, I wish it to be understood that it is not limited in its useful application to this particular purpose, as it may be employed in connection with other signaling systems, such as telegraph, block signaling systems, and the like.

Briefly, my invention embodies, among other features, a selective signaling system having a plurality of signaling stations connected in multiple with a main electric circuit and employing alternating current as the electric energy for operating the selecting apparatus of the system.

In the telephone system set forth herein, by way of showing one application of my invention, the station of the party calling is to be considered the "sending station" and the station of the party receiving the call is to be considered the "receiving station." There may be any number of these stations connected in multiple with the line or circuit, for example twenty or more, and each station is equipped with a selecting apparatus which includes both mechanism for sending a call and mechanism for receiving a call. Therefore, where I hereinafter use the expression "selecting apparatus" I mean to include both the sending and the receiving mechanism, while where I use the term "sending mechanism" it means only the sending part of the selecting apparatus, and where I use the term "receiving mechanism", it means only the receiving part of the selecting apparatus.

In carrying out my invention it is my purpose to provide a selective signaling system such as a telephone system, wherein a plurality of stations are connected in multiple into an electric circuit, and wherein alternating current is employed as the electric energy for operating the selecting apparatus of the system.

By using alternating current for operating the selecting apparatus, I dispense entirely with the use of direct current for this purpose, and I am thus enabled to connect a relatively large number of stations in multiple with a main circuit or line so that I may operate the selecting apparatus over the same wire I use for other purposes, such for instance as for the talking circuit of a telephone system.

Further in the practice of the invention as illustrated herein, I provide a selector apparatus operating with impedance coils connected in multiple with the main circuit and operated by alternating current, the carrying of a direct current over the line being dispensed with, so that my selector apparatus will operate on a ground return circuit.

By employing alternating current in the operation of my system I avoid the expense and disadvantage incident to the employment of direct current in systems of this character. Where a direct current is used, a coil of high resistance cannot be employed, and therefore, the direct current coils cannot be connected in multiple with the line, the consequence being that it is necessary to use a separate wire to select over from that which is used for the talking circuit or else the talking circuit must go through the direct current coils. There are numerous other advantages incident to the use of alternating current in comparison with direct current in apparatus of this character.

With alternating current equipment, the alternating current generated is, of course of high voltage and very low amperage, so that the line offers very little resistance to a current of this nature, whereas with a direct current the selecting mechanism would require such direct current to be of high voltage and also high amperage, as such a direct current must produce the energy or power to operate the selecting apparatus in the cores of the wound magnets, thus necessitating high amperage. As is well known, with a direct current of high amperage a coil of high resistance cannot be used, and thus in systems of this character direct current coils cannot be connected in multiple with a line, so that in telephone work, for instance, separate lines are required for selecting and talking. Therefore, in using direct current on a system not employing a central station, the expense would necessarily be great, as each sending station would have to be equipped with a source of direct current sufficient to operate the entire system. Therefore, owing to the expense in connection with the use of direct current, it is the practice to make selections by employing a central station, while on the other hand by using the alternating current the whole cost of the equipment is so small that every station may be equipped with a source of alternating current, thus rendering it unnecessary to operate with a central station in case where all parties are on the same line.

It will further be understood that the use of alternating current for this purpose posesses many advantages over the use of direct current in the cost of mechanism, in the feature of long distance work, simplicity of construction, facility of operation, and many other features readily apparent to and understood by those skilled in the electric art.

A further object of the present invention is the provision of a signaling system, such as a telephone system, wherein a plurality of telephones are connected in multiple into an electric circuit, and wherein a party at one telephone may signal and converse with a party at another or selected telephone in the circuit without signaling any other stations which may happen to be on the same line.

Another object of this invention is the provision of an apparatus of this nature and adaptation whereby a person at any one of a number of stations connected in multiple into an electric circuit, upon selecting and signaling any other one of said stations, automatically locks off all of the remaining of said stations, except the one desired.

Another object of the invention is the provision of a system of this character whereby two or more stations connected in multiple into an electric circuit may select another of said stations and automatically place such selected station into the talking circuit with the said two or more stations.

It is also my purpose to provide a system of the character described wherein a plurality of telephones are connected in multiple in an electric circuit and wherein a central station may be employed for the purpose of connecting and disconnecting parties on different lines, the construction and arrangement of parts being such that any party on the line may be connected to and disconected from the circuit at any time at the will of the operator at the central station.

With the above recited objects and others of a similar nature in view, my invention consists in the construction, combination and arrangement of parts set forth in and falling within the scope of the appended claims.

In the accompanying drawings:

Fig. 3 is a view in front elevation with the cover or face plate of the box of the selector apparatus removed, this view showing the receiving and sending mechanism of a selecting apparatus in open or idle position.

Fig. 4 is a view partly in side elevation and partly in section showing more particularly the receiving mechanism of the selecting apparatus shown in Fig. 3.

Fig. 5 is a similar view showing more particularly the sending mechanism of the selecting apparatus shown in Fig. 3.

Fig. 6 is a view showing the position occupied by certain of the working parts of the selecting apparatus when a call has been made from the sending station of the apparatus, certain parts of the apparatus being omitted for the sake of clearness.

Fig. 7 is a similar view showing the locked out position of the same working parts of the selecting apparatus of a "dead" or disconnected station when connection has been made between two other stations.

Fig. 8 is a similar view showing the position occupied by the working parts of the selecting apparatus at a receiving station when such station has been called.

Fig. 11 is a detail view in bottom plan showing the cam and lock member of the receiving mechanism.

Fig. 12 is a detail perspective view of a portion of one of the escape wheels.

Fig. 13 is a detail view of the bell and alternating current generator switches connected to their rock shaft.

Fig. 14 is a view in front elevation of a preferred form of telephone embodying my invention.

Fig. 17 is a view partly in section showing more particularly the sending mechanism of the central station.

Fig. 18 is a detail view in top plan showing the two escape wheels of the selecting apparatus and the escape rod and pallet therefor.

Fig. 19 is a diagrammatic view showing the alternating current switches and coils connected in multiple with a main circuit.

Fig. 20 is a detail perspective view of a portion of the selecting apparatus showing the alternating current and local battery switch on their rock shaft and the position of the locking rod to allow the closing of these switches.

In the present instance I have shown two adaptations of my invention, one wherein a plurality of telephone stations are connected in multiple on the same circuit, so that any party on that circuit may talk to any other party on the same circuit without resorting to a central station so that under this condition a central station may be dispensed with entirely. In the other adaptation shown and described a central station is used so that parties on different circuits or lines may communicate with each other.

For the sake of clearness I will first describe in detail the construction and operation of that adaptation of the system wherein the stations are all in the same line, and no central station is required. In this connection reference is to be made to all the figures of the drawings, with the exception of Figs. 2, 15, 16 and 17, which latter figures relate to the system when equipped with a central station.

Figure 1:
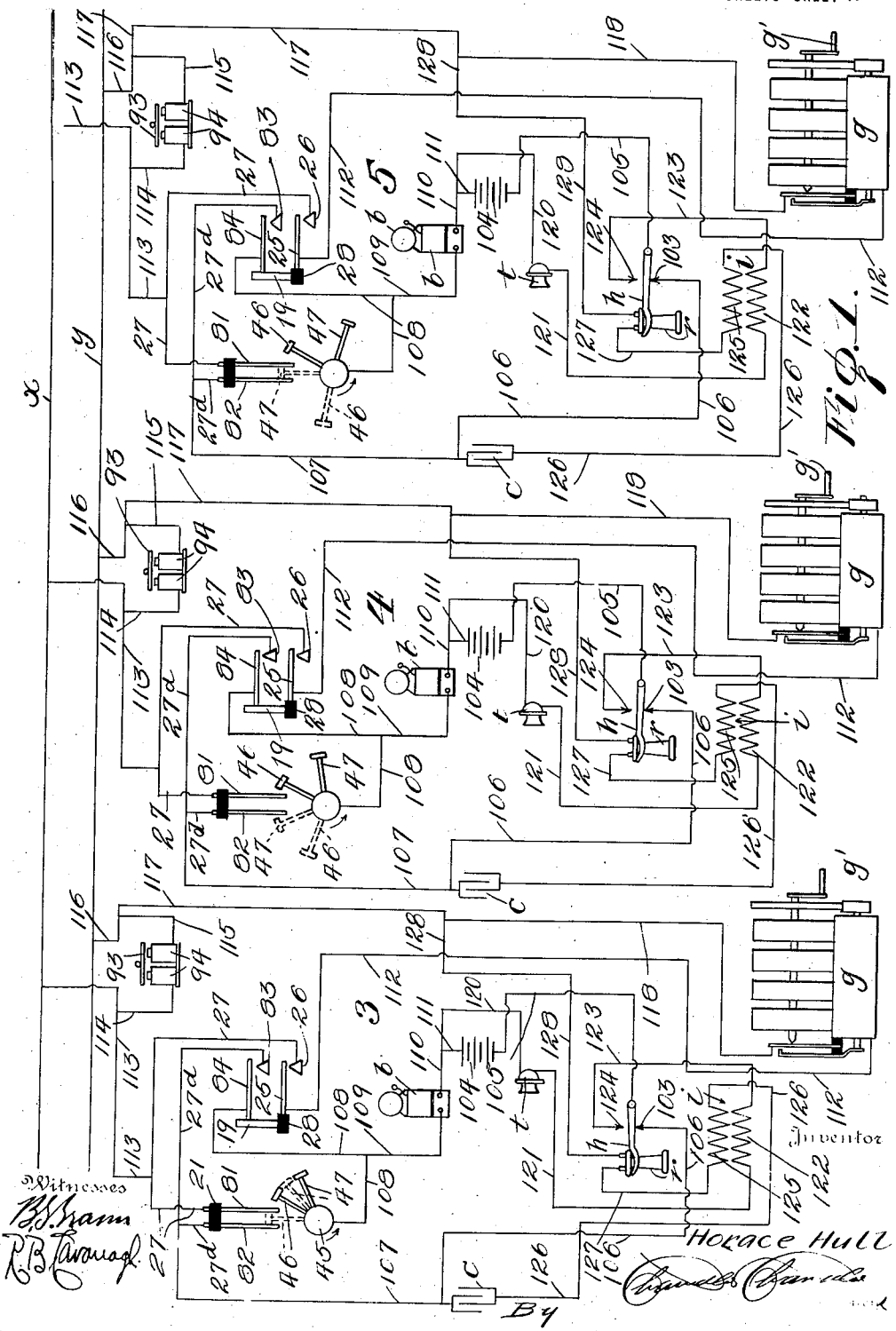
Figure 1 is a diagrammatic view of the circuits and equipment of three subscribers' stations on the same line, with two of the stations connected and an intermediate station disconnected, the connected positions of the two stations being shown by dotted lines.
Figure 2:
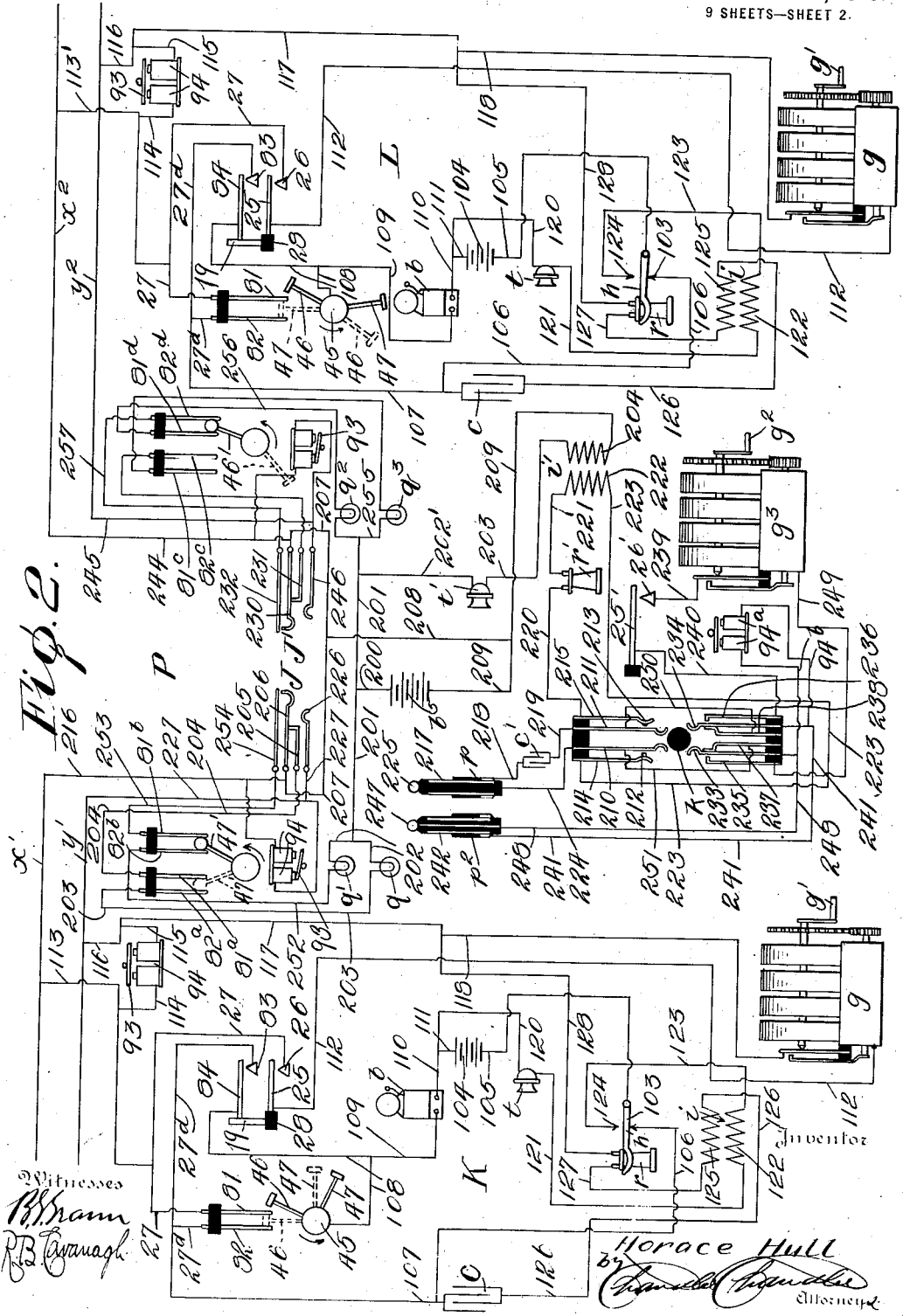
Fig. 2 is a diagrammatic view illustrating two subscribers' stations on different lines and a central station through which connection is made between the two subscribers' stations, the connected positions of the stations being shown by dotted lines.

In Fig. 1 I have shown diagrammatically one arrangement of circuits and electric equipment for enabling parties on the same line to communicate, and in this view I show the system as including three stations 3, 4 and 5, and in considering these stations hereafter, we will consider that the number 3 is the call number of the sending station, the number 4 the call number of the intermediate or locked out station, and number 5 the call number of the receiving or called station. In this Fig. 1, the stations 3 and 5 are connected for service, as indicated by dotted lines, while intermediate station 4 is on an open circuit or "dead", in the sense that while parties 3 and 5 may converse, a party at 4 cannot cut in on the circuit to overhear the conversation, or for any other reason. The line wire of the circuit is shown at $x$, while the return is indicated at $y$.

Each of the stations is equipped with a telephone T, having the usual transmitter $t$, receiver $r$ and receiver hook $h$, as shown in Fig. 14. The telephone casing is indicated by the letters D, while $b$ is the usual bell. The casing is equipped with the usual hinged lid $d$ closing the compartment of the casing wherein is located the alternating current generator $g$ operated by the crank $g'$. The use to which I put this generator will be hereinafter described in detail. Within the compartment with the generator is also located the condenser $c$, as usual. The ordinary local battery 104 for setting up the talking circuit is also located as usual in the casing D, but as will be hereinafter described, I also use this local battery for operating the bell $b$. The induction coil $i$ is also located in the casing, as usual.

To the front of the lid $d$ is connected or attached a box E wherein is located the selecting apparatus which constitutes an essential feature of my invention, and the construction of which is shown in detail in Figs. 3 to 14 inclusive and also Fig. 20.

I will now proceed to describe the structural features of the selecting apparatus, referring particularly to Figs. 3, 4, 5 and 10.

Subsequently I will describe in detail the operation of the entire system, including the various circuits thereof. The selector apparatus is indicated as an entirety by the letter F, and includes a sending mechanism designated as a whole by the letter S, a receiving mechanism indicated as a whole by the letter R and certain operating parts, including an escapement device which is interposed between the sending mechanism and the receiving mechanism for the purpose hereinafter described. the entire selecting apparatus being mounted between the front and back plates 1 and 2 respectively which constitute a suitable support for the working parts of the apparatus.

Figure 9:
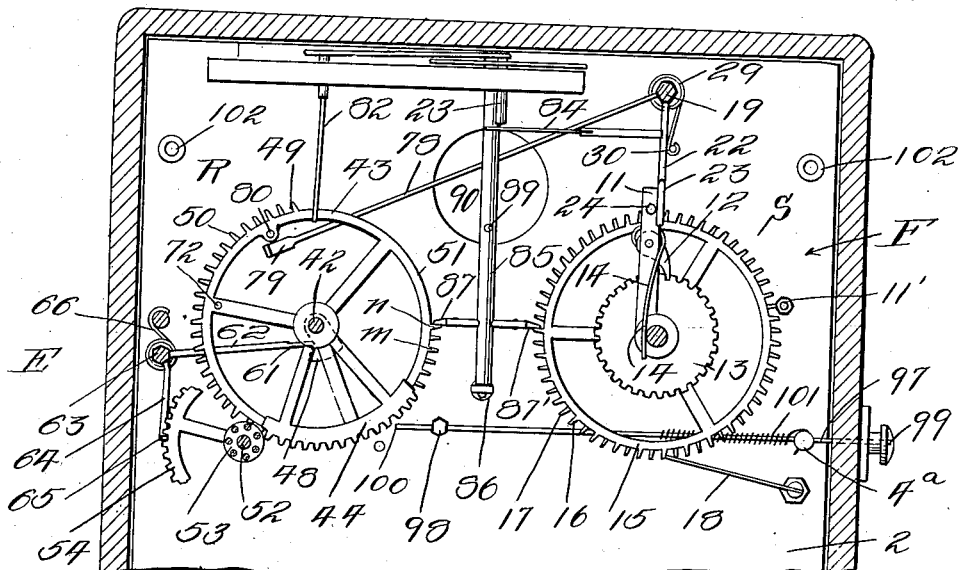
Fig. 9 is a sectional view of the apparatus, shown in Fig. 3 with certain parts omitted, and showing more particularly the push rod for the receiving mechanism, the local battery switch and the gear segment and pinion therefor of the receiving mechanism.
Figure 10:
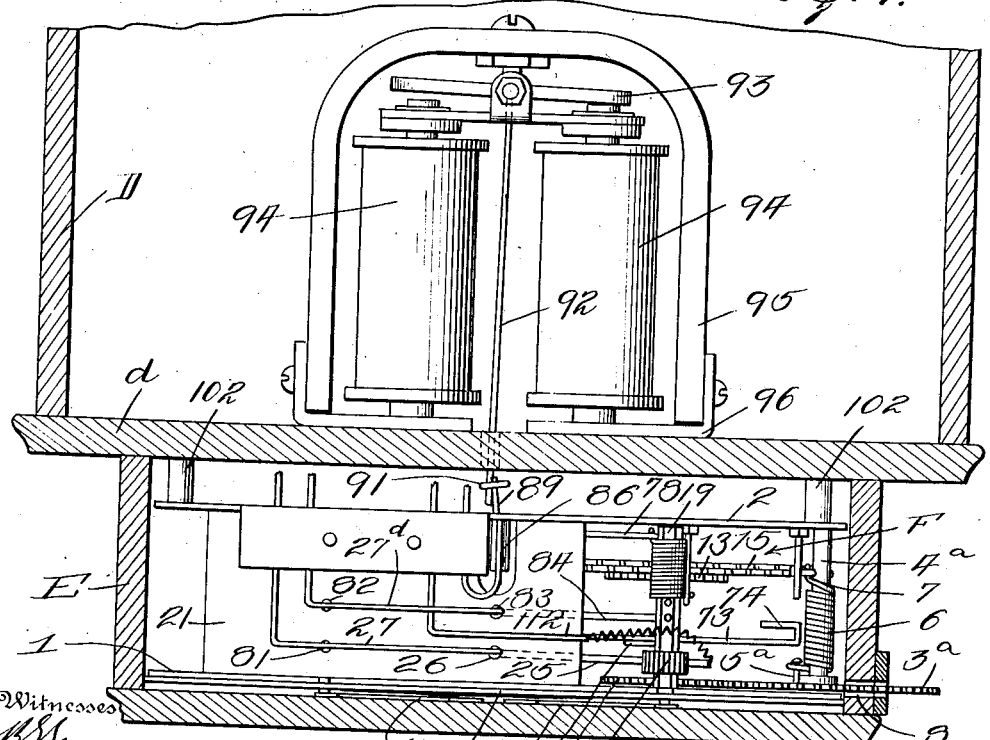
Fig. 10 is a plan view with the casing of the box in section and showing the selecting apparatus of Fig. 3 and the alternating current coils for operating the escapement of the apparatus.

The sending mechanism S includes a thumb wheel $3^a$ loosely mounted on the post $4^a$ connecting the plates 1, and 2, the pin $5^a$ carried by the wheel having one end of a spring 6 connected therewith, said spring being coiled about the post $4^a$ with its opposite end connected to the post at 7. This thumb wheel $3^a$ projects through a slot 8 in the side of the box E so it may be easily manipulated. The thumb wheel is toothed and meshes with a pinion 9 fast on the shaft 10 which shaft has also fast therewith the arm 11. This arm 11 has a dog 12 pivoted thereto, and engaging with a ratchet wheel 13 loose on the shaft 10, a spring 14 normally holding the dog in engagement with the ratchet wheel. This ratchet wheel 13 is fast with one side of the escape wheel 15 loose on the shaft 10, this escape wheel having two rows of circumferentially arranged teeth, the row of teeth indicated at 16, being in staggered relation to the other row of teeth indicated at 17 as will be clearly seen by reference to Figs. 12 and 18. At the front end of the shaft 10 is fastened an indicator hand $v$, which moves over a dial $v'$ having a row of indicating numerals $v^2$ thereon, as shown in Fig. 14. When the thumb wheel $3^a$ is turned by a person desiring to make a call, the hand $v$ moves over the dial to the selected number and thus indicates the number of the station it is desired to call. For instance, if a party at station 3 desires to call a person at a station 5, he turns the thumb wheel $3^a$ until the hand $v$ reaches the number 5 on the dial. This turning of the thumb wheel, rotating the shaft 10 as it does, turns the arm 11 anti-clockwise, for the purpose hereinafter mentioned. The escape wheel 15 being loose on the shaft 10 does not turn therewith, and is prevented from being carried around anti-clockwise with the arm 11 and the dog 12 by the leaf spring 18 which is fastened at one end to the back plate 2 and engages at its free end with this escapement wheel 15, as shown in Fig. 9. The numeral 19 indicates a rock shaft journaled at its rear end in the back plate 2 and at its front end in the metallic bar 20 carried by the insulating block 21 connected with, and extending forward from the back plate 2, as is best shown in Fig. 10. Depending from this rock shaft 19, is an arm 22 terminating at its lower free end in a loop 23. A pin 24 extends from the arm 11 and is adapted to strike against the arm 22 at the loop thereof and rock the shaft 19 so as to move the horizontal contact switch 25 downward away from the contact pin 26 which extends through the insulating block 21 and is connected above the block with the conductor 27. As there are two contact switches connected with the rock shaft 19, one of which is designated by the number 25, and is used to open and close the alternating current circuit, and the other of which is numbered 84 and is used to open and close the local battery or bell circuit, I will hereafter call the switch 25 the alternating current switch, and call the switch 84 the bell switch. The switch 25 is socketed in the insulating block 28 carried by the rock shaft 19, while 29 is a coiled spring normally tending to throw the switch 25 into contact with the contact pin 26, the spring being coiled about a portion of the rock shaft 19 with one of its ends fastened to the rock shaft and the other end secured to a stud 30 projecting from the back plate 2.

The above is a description of the structural features of the sending mechanism S of the selecting apparatus F of each station.

Now, when a party making a call, say from station 3, lifts the receiver $r$, turns the thumb wheel $3^a$ of the sending mechanism to the number on the dial of the station wanted, in the present instance station 5, and rotates the generator crank $g'$, the receiving mechanism R at such receiving station 5 is operated to close the talking circuit at that station and simultaneously close the local battery or bell circuit at the receiving station 5, to cause the bell $b$ thereat to ring. At the same time the operation of the sending mechanism S at the calling or sending station 3 operates the receiving mechanism R of its own station to close the talking circuit of said sending station, as hereafter described.

*The receiving mechanism.*—I will now proceed to describe the construction of the receiving mechanism R of each station. Referring to Figs. 3 and 14, the numeral 31 designates a winding arbor, to which is connected one end of the coiled main spring 32, the opposite end of the spring being connected to a post 33 carried by the back plate 2, the main spring 32 constituting the usual spring motor. This spring is confined against lateral displacement by the back plate 2 and the circular holding plate 33' placed in front of the spring as shown in Figs. 4 and 5. Loosely mounted on the arbor 31 is a gear wheel 34, carrying a pawl 35 which engages with the ratchet wheel 36 fast on the arbor 31. When the arbor 31 is turned to wind up the main spring the pawl and ratchet wheel prevent the backward rotation of the arbor. But when the main spring is unwinding in driving the mechanism the pawl and ratchet wheel will cause the gear wheel 34 to turn with the arbor. A bowed spring 37 holds the pawl 35 in engagement with the ratchet wheel 36. The gear 34 meshes with a pinion 38 on the shaft 39 and turns the latter. This shaft 39 has a gear wheel 40 fast therewith which meshes with the pinion 41 on the shaft 42 driving the latter. The shaft 42 has fast therewith the escapement wheel 43, the gear segment 44, the collar 45 carrying the contact pins 46 and 47, and the cam 48, the latter being at the rear of the escape wheel 43, as shown in Fig. 11. I will state here that the contact pin 46 is employed to close the talking and bell circuits when the telephone is used as a sending or calling station, while the contact pin 47 is used to close these two circuits when the telephone is used as a receiving or called station, as will be herein described.

The escape wheel 43 has two segmental rows of teeth 49 and 50, arranged in staggered relation, or similar to the teeth 16 and 17 of the escape wheel 15 as shown in Figs. 12 and 18, a portion of the periphery of this escape wheel 43 being devoid of teeth as at 51. Fast on the shaft 52 is a pinion 53 with which meshes the segment gear 44 at certain times to rotate the shaft 52 through this pinion 53, the shaft 52 having fast therewith a gear wheel 54 which meshes with the pinion 55 of the shaft 56 turning the latter and consequently the gear wheel 57, which is fast with the shaft 56. This gear wheel 57 meshes with a pinion 58 fast on the fan shaft 59, the latter carrying a fan 60, which is used as a governor fan to govern the speed of rotation of the escape wheel 43 when the toothless section 51 of the escape wheel is passing the pallet 87 at which time the segment 44 is in mesh with the pinion 53. As shown in Fig. 11, the cam 48 on the shaft 42 rides against the shouldered end 61 of the arm 62 carried by the small rock shaft 63 which has depending therefrom the locking arm 64 having a lateral end 65 adapted to engage the teeth of the gear wheel 54 as long as the cam continues to bear against the end 61 of the arm 62, which is just so long as the segmental gear 44 is in mesh with the pinion 53. When, however, the segmental gear moves away or off from this pinion, as shown in Fig. 9, the cam 48 will move from under the arm 62 permitting the spring 66 to throw the arm 64 and cause its end 65 to engage the gear wheel 54 and lock it against further rotation. The purpose of locking this gear wheel 54 after the segment gear 44 has left its pinion 53 is to hold the pinion 53 in proper position for the next engagement of its segment gear 44. It is to be noted that the segment gear 44 only engages with the pinion 53 at the time when the section 51 of the escape wheel 43 is passing the pallet 87 of the escapement device, and as the pallet cannot at this time engage and govern the movement of the escape wheel 43, the segment 44 will do so as it is on the same shaft 42 as the escape wheel 43 and engages the pinion 53 of the governing train of gearing at the time mentioned.

Extending from the back plate 2 is a stud shaft 67 having loosely mounted thereon a sleeve 68 provided with flanges 69 and 70. Depending from the flange 69 is an arm 71 adapted at certain times to be struck by the pin 72 projecting laterally from the escape wheel 43, so that the arm 71 will be moved to rock the sleeve 68 and depress the locking rod 73 attached at one end of the flange 70. This rod 73 which is preferably made of wire, extends horizontally across to the sending mechanism S, the rod passing through the loop 23 of the arm 22. This locking rod 73 is formed at its outer end with a depending hook 74. The locking rod is further provided with a locking block 76. This block, when the telephone is not in use lies just to one side of the loop 23 and in alinement or centered therewith, as in Fig. 3 so when the thumb wheel 3$^a$ is turned in making a selection the loop 23 will be thrown over the block 76, as shown in detail in Fig. 20. When the talking circuit is closed, the locking block 76 at the sending station 3, will lie depressed at one side of the loop 23, as shown in Fig. 6, while at the same time the counterpart locking blocks 76 at the stations 4 and 5 and any other stations on the line, will be elevated and lie at one side of the loop 23 as shown in Fig. 7. The reason for this will be set forth in the description of the operation of the system. A coiled spring 77 normally tends to throw the locking arm 73 to its elevated position as shown in Fig. 4. The numeral 11' designates a stop pin projecting from the back plate 2 which pin is designed to limit the anti-clockwise rotation of the arm 11 so that after the pin 24 on the arm has struck the hook 74 of the locking rod 73 sufficiently to raise the latter and permit loop 23 to straddle block 76 and allow switch 25 to close, such arm 11 will be stopped from further movement by the stop pin 11', and the liability of the arm 11 continuing its upward movement and bending or breaking the locking bar 73 is thereby avoided.

For the purpose of holding the escape wheel 43 of the receiving mechanism R of a station against rotation while a selection is being made, or a party called, from that station, I provide a latching bar 78 extending across to the receiving mechanism R which has its free end offset at 79 to engage the pin 80, carried by the escape wheel 43. When the thumb wheel 3$^a$ is turned in making a selection and the rock shaft 19 consequently rocked by its spring 29, this latching bar 78 will engage at its offset end with the pin 80 of the escape wheel 43 and hold the latter against rotation.

Extending through the insulating block 21 are the spaced contact plates 81 and 82 which are connected with the conductors 27 and 27$^d$, respectively, these contact plates being adapted to be bridged or connected by the contact pins 46 and 47 to close the talking and bell circuits. The contact plate 82 is further connected through its wire 27$^d$ with the contact pin 83, the latter being designed to be contacted with by the contact arm 84 carried by the rock shaft 19 to close the local battery circuit through the bell.

Fast with the front end of the shaft 42, as shown in Fig. 14, is an indicator hand $w$ which moves over the dial $w'$, the latter constituting the indicating dial of the receiving side of the telephone. This indicating dial is provided with a row of numbers $w^2$, these numbers on the receiving dial corresponding to the numbers on the sending dial of the apparatus.

The escapement device includes a vertically disposed rocker bar 85 mounted to turn in bearing studs 86 projecting inward from the back plate 2. This bar 85 extends vertically between the two escape wheels 15 and 43 and is provided with oppositely disposed pallets 87 and 87' adapted to engage the teeth on the peripheries of the escape wheels 43 and 15 respectively. Screw studs 88 are mounted in the back plate 2, and act as adjustable stops for the pallets 87 and 87' to limit the rocking movement of the bar 85. The numeral 89 designates an arm connected to the rear of the bar 85 and this arm projects through an opening 90 cut in the back plate 2. This arm is for the purpose of rocking the escapement bar 85 and it is actuated as follows: The outer end of the arm 89 terminates in a loop 91 through which projects the free end of the armature rod 92. This armature rod is rigidly connected at one end to the rocking armature 93 of the alternating current coils 94, the numeral 95 indicating the permanent magnet of the alternating current coils. The alternating current coils and their magnet are fastened to the inner side of the telephone lid $d$ by the soft iron supporting bar 96, which is slotted to permit of the vibration of the armature rod 92.

Referring to Fig. 9, the numeral 97 indicates a reciprocating or push rod sliding through an opening in the shaft $4^a$ and through an opening in the guide stud 98, the outer end of the rod extending through the side of the box E and having a push button 99 at the outer end thereof by means of which the rod may be pushed inward to have its end 100 engage with the teeth of the escape wheel 43 to lock such wheel against movement when it is desired to put a third party on the line, so that all three parties may confer. A spring 101 normally holds the rod 97 out of contact with the escape wheel 43. Legs or studs 102 are used to hold the back plate 2 to the back of the box E and thus support the selecting apparatus in the box.

The above is a description of the mechanical construction and the relative location of the various parts which go to make up the selector apparatus F, including the sending mechanism S and the receiving mechanism R, and I will now proceed to describe in detail the operation of that embodiment of the system as is diagrammatically illustrated in Fig. 1, wherein I have shown three stations connected in multiple in one main circuit, such system dispensing with a central station, which figure also embodies the electrical circuits. For a clear understanding of the invention in Fig. 1 I have shown a system embodying three stations or telephones on the same line, and each of these stations is equipped with similar apparatus, that is to say, a telephone which in addition to the usual equipment of the transmitter, receiver, and the like, is provided with my selecting apparatus. In this case we will assume that the party at the first station 3 wishes to talk to the party at the third station 5, so that the party at the second station 4 is to be cut out. The party at station 3 desiring to call station 5, now proceeds as follows:

When the entire line is clear, that is to say, when none of the stations or telephones are in use, the parts of each selecting apparatus F are in "clear" or "open position" as shown in Fig. 3, and the circuits are open as shown in full lines in Fig. 1. At this time the indicator hands $v$ and $w$ of the receiving and sending dials of each apparatus lie as is shown in Fig. 14, that is to say, at the point marked "open line." Now, the first thing the calling party at the station 3 does is to lift the receiver $r$ from the hook $h$, allowing the hook lever which also constitutes part of the usual receiver switch, to move up away from the receiver contact point 103 and thus break the local battery circuit or bell circuit to prevent the ringing of the bell of the sending station 3. By reference to Fig. 1, this local battery or bell circuit for the sending station may be traced from the battery 104 through the conductor 105 to the receiver hook $h$ which forms part of the switch, thence when the receiver hook is down, through the contact point 103, conductor 106, conductor 107, conductor $27^d$ to the contact pin 83, through contact bar 84, to conductor 108, which latter may be the frame of the selecting apparatus, thence to conductor 109, to the bell $b$, through the bell $b$ to the conductor 110 and back to the battery through conductor 111. Now, the instant the party at station 3 begins to turn the thumb wheel $3^a$, the contact switch 84 will contact with pin 83 to close the bell circuit and this is the reason the receiver $r$ should be lifted from the hook before the thumb wheel is turned, as otherwise the bell would ring at the station 3 and cause annoyance. By lifting the receiver from the hook, however, the hook leaves the contact point 103 and breaks the bell circuit at the station 3.

Now the actuation of the generator $g$ from the sending station 3 closes the local battery or bell circuit at station 5 by causing pin 47 to move into bridging or contact position between the contact plates 81 and 82 at station 5, and the closed local battery or bell circuit at this receiving station 5 may be traced as follows: From the battery 104 at station 5, the current passes through conductor 105, to receiver hook $h$ which is down, through contact 103, conductor 106, to conductor 107, to conductor $27^d$, contact plate 82, pin 47, to conductor 108, to conductor 109, through bell $b$, through conductor 110 and conductor 111, to the battery 104. This is the bell or signal circuit at the receiving station. When the receiver is lifted from its hook $h$ at the receiving station 5, this circuit is opened or broken and the bell will cease to ring.

After lifting the receiver $r$, the party calling from station 3 turns the thumb wheel $3^a$ until the indicating hand $v$ of the sending dial points to the number "5" on the dial, this being the call number of station 5. When the thumb wheel $3^a$ is so turned, three things will take place in the selecting apparatus. The alternating current circuit is closed for the generator and bell; the latching arm 78 moves into position ready to hold the escape wheel 43 of the receiving mechanism of the sending station 2; and the arm 11 at the station 3 is moved anti-clockwise a predetermined number of teeth. In other words the turning of the thumb wheel $3^a$ and the consequent rotation of the gear wheel 9 causes the rotation of the indicating hand to move the latter over the dial to the desired number 5. At the same time the shaft 10 rotating carries with it the arm 11, the dog 12 slipping over the teeth of the ratchet wheel 9 so that the ratchet wheel and its escape wheel 15 remains stationary. Now, the instant the arm 11 starts to move toward the left the pin 24 of said arm, of course, moves away from contact with the depending arm 22 and the spring 29 immediately rocks the shaft 19 to let the loop 23 of the arm 22 straddle the locking block 76. At the same time the partial rotation of the rock shaft 19, under the influence of the spring 29 throws the contact switches 25 and 84 against the contact pins 26 and 83 respectively to close the local battery or bell circuit heretofore described, and also closes the alternating current circuit from the generator $g$ to the main wires $x$ and $y$. This turning of the rock shaft 19 also moves the latching arm 78 upward so that the offset end 79 of the latching rod will be moved into alinement with or in front of the pin 80 carried by the escape wheel 43 of the receiving mechanism of the selecting apparatus.

Now, when the alternating generator circuit has been closed by the contact of the switch 25 with the contact pin 26, and the crank $g'$ of the alternating current generator $g$ is turned to excite the latter and set up the alternating current, said current will flow from the generator $g$, through the conductor 112 to the switch 25, contact pin 26, conductor 27, conductor 113, to the line wire $x$. A portion of the current is shunted off through the alternating current coils 94 of each station on the line. In making the shunt the current passes from the conductors 113, to conductors 114 through each set of coils 94, and after passing through the coils flows through the conductor 115 and conductor 116 to the return line $y$ along which the current passes to the conductors 117 and 118 back to the alternating current generator from which it started. While the return wire $y$ is herein shown in the nature of a metallic return, it is to be understood that the ground would serve the same purpose.

Now, referring to the example presented, where a party at station 3 desires to call the party at station 5, when the party at 3 turned the thumb wheel $3^a$ to move the indicator hand to the number 5 on the sending dial, the dog 12 on the arm 11 passed over six teeth on the ratchet wheel. This occurs, because as above stated, the indicator hands $v$ and $w$ of each station point to the indication "open line" when the circuit is clear or not in use, and at this "open line" position of the telephone, the contact pin 46 of each telephone is just one step or space back of the contact plates 81 and 82, that is to say it takes just one cycle of the alternating current or one complete vibration of the armature by the coils 94 to bring all pins 46 into bridging position between the contacts 81 and 82, and when the dog 12 moves a notch on the ratchet 13, this corresponds to one cycle of the alternating current, which causes one complete vibration of the escape rod 85. It is to be noted that the pins 46 of all the stations are set in the same relative location on the collars 45, that is to say, when the line is clear all of the pins will be just one step or space back of their adjacent contact plates 81 and 82 as shown in full lines in Fig. 1. On the contrary, the contact pins 47 of the stations are all located at different positions on their collars relatively to each other, that is to say each pin 47 will require a different number of cycles of the alternating current from every other pin 47 to bring it into bridging contact between the plates 81 and 82. For instance, if the contact pin 47 at station 3 would require four cycles of the alternating current to bring it into bridging position, the station 4 would require five cycles of the current for this purpose and the station 5 would require six cycles. When the thumb wheel $3^a$ has turned the indicator hand $v$ to "5" on the dial it has really moved the dog 12 six teeth over the ratchet because the hand $v$ has to move one space from the "open line" position to the "0" character on the series of numbers, so that such hand is really moved over six characters, that is from "open position" to "5," including "zero position," and the dog is correspondingly moved over six teeth.

Now, it should be borne in mind that the turning of the thumb wheel $3^a$ to move the indicator pointer $v$ of the sending mechanism to the number "5" of the dial of the sending mechanism, in addition to closing the generator and bell circuits, merely moves the arm 11 with its dog 12, idly anti-clockwise over the escape wheel 15 and also drops the latching rod 78 that engages pin 80 of escape wheel 43 of the receiving mechanism of the sending station 3 into position to catch the escape wheel and prevent its extended rotation. This dropping of the latching rod 78, however, takes place only at the sending station 3, that is at the other two stations 4 and 5, on the line the escape wheels 43 and their receiving mechanism will not be impeded against rotation because the latching rods are in their depressed position. Now, when the generator $g$ is operated at station 3, what takes place is that the alternating current flowing through the generator circuit to the alternating current coils 94 will vibrate or rock the armature of the coils and consequently cause the armature rod 92 to vibrate from side to side and correspondingly vibrate the arm 89 which is connected with the vertical escapement bar 85. This bar in turn is rocked from side to side. The first half turn or rock of the bar 85 will cause the pallet 87' to move from the tooth of the escape wheel 15 with which it is engaged, and likewise pallet 87 moves off the first tooth $n$ of the escape wheel 43. The arm 11 with its dog 12 thus moves backward toward its starting point one tooth under the action of the spring 6, carrying with it, of course, the escape wheel 15. Also when the pallet 87 leaves the tooth $n$ the pin 80 strikes against the offset end 79 of the latch rod 78. The consequence is that the escape wheel 43 is held against further rotation at this time by the latching rod 78 and the contact pin 46 is a half step from the contact plates 81 and 82, that is to say it does not quite reach these plates to close the talking circuit at this point. Of course, at this time the end of the pallet 87 of the escape rod 85 lies half way between the first and second teeth of the escape wheel 43 so that it may work idly sidewise during the time that the wheel 43 is held against rotation. At this time, therefore, the escape wheel 43 of the receiving mechanism of the sending station 3 is held against rotation, while the escape wheel 15 of the sending mechanism of the sending station 3 may operate under the step by step action of the escape rod 85 and pallet 87' when vibrated by the alternating current. At the same time the other two stations 4 and 5 only the escape wheels 43 of the receiving mechanisms may be rotated at these two stations and escape wheels 15 of the sending mechanisms are in their original positions which they occupy when the line is clear, as shown in Figure 3, and the escapement pallet 87' rocks idly between the teeth of their wheels 15. Now, as the party calling continues to turn the crank of the generator at the station 3, he imparts six cycles of alternating current to the coils 94 and consequently completely vibrates the escapement bar 85 six times, which will bring the bar 11 and the dog 12 back to its original starting position at the sending mechanism of station 3, so that the pin 24 will again strike the arm 22, throwing this arm outward, rocking the shaft 19, opening switches 25 and 84 and breaking the alternating current circuit as well as the bell circuit. The latching arm 78 at this time is depressed moving the offset end 79 thereof out of the way of the pin 80 of the escape wheel 43 of the receiving mechanism at the sending station 3, permitting the contact pin 46 to pass to a position between the contact plates 81 and 82, and bridge or close the talking circuit as well as the bell circuit at this point. It is to be understood that arm 11 carrying pin 24 is placed in such position with relation to the arm 22 and escape wheel 15 that it opens the alternating current switch 25 between the negative and positive impulses of the current and thus compels the armature bar 93 of alternating coils 94 to stop vibrating with the same end resting on the core every time, and at every station on the line, and, of course, this rocks shaft 85 to the left each time the circuit is broken, and this leaves pin 87 in an elevated position, both when a selection has been made and also when the line is clear.

In the meantime, at the receiving mechanism of the called or receiving station 5, the escape wheel 43, which as stated was free to rotate under the action of the vibrating escape bar, has been stepped around six teeth or until the contact pin 47 bridged the contacts 81 and 82 and thus closed the talking circuit at this station 5.

Now, while we have connected the station 3 with the station 5, it will be evident that the station 4 could not have been connected because the only station which could be connected in the circuit at this time was station 5 which required six cycles of the alternating current, or six complete vibrations of the escapement device to bring the pin 47 into position between the contact plates 81 and 82 to close the talking circuit. The intermediate station 4 on the line having its pin 47 set relatively closer to the pin 46 than is the pin 47 to the pin 46 of the station 5, such pin 47 of station 4 would, of course, reach the point between its contact plates 81 and 82 sooner than the pin 47 of the station 5 would reach its contact plates and consequently the continued action of the alternating current due to the continued operation of the generator, would move the pin 47 of the station 4 through the space between the contact plates 81 and 82 and beyond or past the same so that there would be no closed circuit at this point by the time the contact pin 47 of station 5 was in closed position, and as stated, this occurs when the arm 11 at the sending station returns to its original position.

The parties 3 and 5 may now hold their conversation with the other party 4 on the line cut out, because as stated the pin 47 of party 4 is not in position to close the talking circuit at the receiving side of this station. Of course, the operation of the generator at the sending station, causes the indicating hands w at the receiving dials of the stations 4 and 5 to both move to position to indicate that the phone 5 had been called and, therefore, all parties on the line will see that the line is "busy" because station 5 has been called.

Now, while the parties 3 and 5 are talking, it will be seen that, referring to the dial faces of the three stations on the line, in the sending station 3 the indicator hand w has moved one step upward or to the point "ring off" and this shows that the pin 46 is in position between the contact plates 81 and 82 to close the talking circuit at the sending station. The indicating hand v of the sending station 3 has, of course, returned to the position marked "open line" because the shaft 10 carrying the arm 11 with the dog 12 has returned to its normal position from which it started. On the dials of the stations 4 and 5 the indicating hands w of the receiving mechanisms both point to "5", the number of the station called, while the hands v of the sending mechanism of the other two stations 4 and 5 remain at the original position of "open line" because the sending mechanisms of these two stations have not been disturbed.

As the parties at the stations 3 and 5 are now ready to converse the talking circuit is closed and completed as follows: From the battery 104 the current flows through the conductor 111, conductor 120 to the transmitter t of station 3, thence through the conductor 121, through the primary winding 122 of the induction coil i, thence through the conductor 123 to the contact 124 of the receiver switch, now contacted with by the receiver hook h forming a part of the switch. The current then passes through the receiver hook and conductor 105 back to the battery 104, thus completing a primary or transmitter circuit. The same transmitter circuit, of course, is set up in the station 5 by the party at such station removing his receiver r. Now the primary or transmitter circuit just described sets up an induced current in the secondary winding 125 of the induction coil i, and from this winding the induced current flows through the conductor 126, through the condenser c, conductor 107, part of conductor 27ᵈ, contact plate 82, pin 46, contact plate 81, part of conductor 27, conductor 113 to the line wire x and over the line wire to the station 5, the current passing at station 5 through conductor 113, conductor 27 to the contact plate 81, through the pin 47 to the contact plate 82, thence to the conductor 27ᵈ, to conductor 107, through the condenser c, conductor 126, through the secondary winding 125 at station 5, through the conductor 127 leading to the receiver r of station 5 through the receiver to the conductor 128 to the conductor 117 and back to the return y, the current flowing back through the return y from station 5 to station 3 where it passes down through the conductors 116 and 117 to the conductor 128 and back to the receiver r, thence through the receiver and conductor 127 to the secondary winding of the induction coil i, thus completing the talking circuit. Of course, that party at the station 4 cannot listen to any conversation which takes place between the parties at the stations 3 and 5, because the talking circuit of the party at the intermediate station 4 is broken or open at the contact plates 81 and 82, as shown in Fig. 1, both the pins 46 and 47 of this station having been moved through the contact plates to a position forward or past the contact plates 81 and 82, as shown in dotted lines in said Fig. 1. At the same time by reference to Fig. 1, it will be noted that the contact pin 46 of the sending station 3 is in position between the plates 81 and 82 to close the talking circuit of the station 3, as shown in dotted lines, and the pin 47 has been moved between the contact plates 81 and 82 to close the talking circuit at the station 5, as shown in dotted lines. Of course, the contact pin 46 at the sending station 3 was locked by the latch rod 78 in its half stepped position and at the time the circuit of the generator g was broken the latch 78 was removed and the contact 46 was permitted to move another half step to bridge the contacts 81 and 82 by reason of the escapement member 87 having stopped in normal position, while at the receiving station 5, the escape wheel 43 was not held against rotation, therefore, while the pin 46 was moved through and past the contacts 81 and 82 at station 5, the pin 47 was brought by the six cycles of alternating current into circuit closing position between the contact plates 81 and 82.

Now, when the parties at the stations 3 and 5 have finished their conversation, the line is cleared or restored to its normal open position as follows:

The party at the sending station 3 first rotates the thumb wheel 3ᵃ to bring the hand v from its position marked "open line" to the position marked "ring off". I might mention that this rotation of the thumb wheel 3ᵃ should take place before the receiver is hung up at the sending station 3, as otherwise, should the receiver be hung up first the local battery bell circuit will close at station 3 and ring the bell at such station and thus acting as an indication to the party at station 3 that he has not cleared the line. In other words, I make provision for insuring that the party at the station 3 will not through forgetfulness fail to clear the line after the conversation is finished, as the act of hanging up the receiver, ringing the bell, will act as an audible signal or warning that the line has not been cleared. Therefore, it is necessary to turn the thumb wheel 3ᵃ as the first act of clearing. When the talking circuit is closed and the conversation in progress, the locking arm 73 has occupied the position shown in Fig. 6 at the station 3, that is to say with the locking block 76 in its lowest position relative to the loop 23 of the arm 22. Now, when the thumb wheel 3ᵃ is turned until the indicator hand v is at the position marked "ring off" in Fig. 14, this act at the sending mechanism of the sending station 3 has caused the arm 11 to travel around anti-clockwise until the pin 24 on this arm strikes against the underside of the hook 74 of the locking rod 73 and springs this locking rod with the locking block 76 upward to the intermediate position shown in Fig. 3. This permits the spring 29 to turn the rock shaft and throw the arm 22 inward so that the loop 23 straddles the block 76 as shown in Fig. 20, this again closing the alternating current circuit by the contact of the contact switch 25 with the contact pin 26. The party at the sending station 3 then turns the generator crank g', again setting up the alternating current, and as the alternating current circuit is closed the crank of the generator is turned to send a sufficient number of alternating current cycles over the alternating current circuit to cause the vibration of the escapement rod 85 to vibrate a sufficient number of times to move the arm 11 and dog 12 in the opposite direction or clockwise, thereby rotating the escape wheel 15 until the pin 24 on the arm 11 again reaches its normal or original position and strikes the loop 23 of the arm 22, thereby rocking the shaft 19 and depressing the contact switch 25 again breaking the alternating current circuit. It is to be understood that when the circuit is closed by the contact switch 25 and pin 26 in clearing the line, and the generator g operated, the escape wheel 43 is rotated anti-clockwise under the action of the vibrating movement of the escape bar 85 at the same time that the arm 11 is rotated clockwise or returning to its normal position. The result of the rotation of the two escapement wheels just described is that the parts are returned to the normal position shown in Fig. 3 with the indicator hands at the sending station pointing to the position marked "open line" on the dial, while the indicating hand w at the stations 4 and 5 are both returned to the position marked "open line" on the dials of the receiving mechanisms at those stations. Of course, at the stations 4 and 5 the hands v of the sending mechanism have not moved at all, as the sending mechanism has not been operated at these stations, while the alternating current cycles flowing through the coils 94 at the stations 4 and 5 have operated the escapement bars 85 at those stations to move the escapement wheel 43 of those stations anti-clockwise to return the hands w to indicate the "open line" position on the dials. Of course, this would occur no matter how many stations were on the line.

The contacts 83 and 84 are necessary only to compel the party making the selection, to complete the operation of clearing up the line. For instance, the line is clear and in readiness for a call to be put through, pin 72 is engaging arm 71 which holds back 76 in central position of loop 23 which governs the operation of switch arms 25 and 84 fastened to post 19. When the station calling has removed the receiver from the hook and selected another station and when through with his conversation he must clear up the line or system, but in the event he should neglect to clear the line when he had hung up his receiver, his bell would ring through battery 104, conductor 111, 110, b, 109, 108, pin 46, contact 82, 27ᵈ, 107, 106, contact 103, hook h, 105 to battery.

The ringing through the contact points 46 and 82, notifies him to clear the line, he must turn the thumb wheel 3ᵃ, until the arm 11 engages the offset end 74, rod carrying locking block 76, arm 11 forces upward rod 74 until block 76 permits loop 23 to pass over and allow the generator circuit to close through contact points 25 and 26 at the same time closing battery contacts 84 and 83.

Now suppose he should have turned his generator but a one-half turn, he would throw contact point 46 out of engagement with 82 and, if the receiver is hung up without finishing the operation of clearing up (by turning the generator) the bell would ring as follows: 104, 111, 110, b, 109, 108, 84, 83, 27ᵈ, 107, 106, contact 103, hook h, 105 to battery again.

The bell will continue to ring with the receiver on the hook until the generator is turned sufficiently to return arm 11 until pin 24 engages arm 22 and opens the bell circuit point 83 and 84 and at the same time opens the generator circuit at points 25 and 26.

The above is a complete description of the operation when two parties are on the line and it is not desired to have a third party cut in on the circuit. However, circumstances may arise when it is desirable for two parties, such for instance parties 3 and 5 holding a conversation to have a third party, such for instance as the party at the station 4, take part in the conversation and in this instance it is, of course, necessary to call this third party 4 and to put him into the talking circuit. This operation takes place as follows: The party at the receiving station 5 pushes the button 99, thereby shifting the push rod 97, shown in Fig. 9, forward until the end 100 of this rod engages with the escape wheel 43 so that this wheel will be held against rotation so long as the party continues to push the button 99 inward and consequently the contact pin 47 at this station will be held between the contacts 81 and 82 irrespective of any clearing of the line from the station 3, because the contact pin 47 cannot move as long as the wheel 43 is stationary. Now, after the party at 5 has thus held his contact pin 47 against movement to keep his end of the talking circuit closed, the party at the sending station 3 turns his thumb wheel 3ª around to the point marked "ring off" as before described, in clearing the line, then operates his generator g and thus clears the line as before described by operating the generator crank, that is the line is clear with the exception of the party at 5 who is still holding the contact pin 47 to close the talking circuit at this station. The party at 3 then operates the thumb wheel 3ª again to turn out the indicator hand v to the number of the station of the third party, in the present instance number 4, and calls station 4 in the ordinary manner, as in calling the station 5, heretofore described in detail. The station 4 is now on the circuit and as the cycles of the alternating current have ceased, the contact pins 47 of both stations 4 and 5 are closing the talking circuit at these stations, in addition to the bell circuit at station 4, while the pin 46 at the station 3 is closing the talking circuit at that station. The consequence is that the party at station 4 is signaled by the closing of his bell circuit, as heretofore described for the closing of the bell circuit of the station 5, and as soon as he lifts the receiver all three parties may hold a conversation. When they have finished the party 3 clears the line in the ordinary manner.

The following describes the use and operation of the lock block 76 at the calling or sending station only, in the present instance the station 3:

Now it will be seen that when the entire selecting apparatus is at the open position as shown in Fig. 3, the locking block 76 on the locking rod 73 is held opposite the loop 23 of arm 22 by the engagement of arm 71 with pin 72 which is set in the rim of the escape wheel 43, and when the arm 11 carrying the pin 24 is moved around away from engagement with loop 23 of arm 22 it will permit loop 23 to straddle lock block 76 of locking rod 73, the arm 22, switch 25, latching rod 78 and switch 84, all being fast with the rock shaft 19, as shown in Fig. 3. This shaft 19 moves clockwise under the tension of spring 29 until the ends of the switches 84 and 25 engage the contact pins 26 and 83. At this position the offset end 79 of the latching rod 78 is held in the path of pin 80 of the escape wheel 43. Presuming that the arm 11 was turned around so as to call station 5, the action at the sending station is as follows: The switch 25 engaging pin 26 closes the alternating current circuit, while the switch 84 engaging pin 83 closes the bell circuit, the offset end 79 of the latching rod 78 standing in the path of pin 80 of the escape wheel 43. Now when the generator is operated and the current flows it permits the rotation of escape wheel 15 but escape wheel 43 is only permitted to rotate one step, or half the distance between two teeth n and m and the escape pallet 87 vibrates idly because pin 80 engages offset end 79 of the latching rod 78. But the escape wheel 15 rotates until arm 11 carrying pin 24 engages loop 23 of arm 22 and moves it counterclockwise until it engages stop pin 30. Therefore the arm 22, switch 25, switch 84 and rod 78 all move in unison and thus it will be seen that the switch 25 moves away from pin 26 which breaks the alternating current circuit. At the same instant the switch 84 moves away from the pin 83 which breaks the bell circuit at that point; also the latching rod 78 carrying offset 79 is disengaged from pin 80 of escape wheel 43 and the escape wheel is then permitted to rotate until the escape tooth rests against the pallet 87. The rotation of the escape wheel 43 from tooth n to tooth m has brought the pin 72 in such a position in describing a circle that it now moves arm 71 a little to the left and this causes locking rod 73 to move downward, the arm 11 carrying pin 24 having moved loop 23 back out of the way, as shown in Fig. 6. This permits lock block 76 to drop down in front of the loop 23. The reason why the lock block 76 was forced down and locks the alternating switch open is because the arm 11 must be turned around sufficiently to permit enough cycles of current to pass to cause the escape wheel 43 to rotate to the blank space 51 in its rim, and it will be seen that when the arm 11 is turned around until pin 24 engages hook 74 of the locking rod 73 it springs this rod 73 upward until loop 23 of arm 22 again straddles block 76, and thus again rotates rock shaft 19 which in turn moves the switch 25 into contact with pin 26, also moves end of switch 84 into contact with pin 83 and also moves rod 78 with offset end 79 upward, but this offset end 79 does not now engage pin 80, as such end comes up behind the pin 80. Now when the generator is again operated both escape wheels 15 and 43 rotate, the wheel 43 rotating under action of escape device until the blank space in its rim is reached. The wheel 15 rotates until pin 24 of arm 11 again engages loop 23 of arm 22 and again moves it back and breaks the alternating current circuit, but the wheel 43 rotates slowly under the government of the fan train of gearing until the escape tooth again rests against pallet 87, but just before the escape wheel reaches this position the pin 72 again engages rod 71 and again places block 76 of latching rod 78 directly in front of loop 23 of arm 22 which is the open position shown in Fig. 3.

Having described the use and operation of the locking block 76 and its associated parts at the sending station 3, I will now proceed to describe the use and operation of this block at the receiving station 5, as well as the station 4, and any other "dead" or cut out station which may be in the circuit.

Referring to Fig. 8, when the escape wheel 43 rotates beyond the tooth $m$ at station 5, it causes the pin 72 to disengage from rod 71 which permits the rod 73 to be moved upward under tension of the spring 77, thus bringing the lock block 76 in front of the upper part of the loop 23 of the arm 22, and it remains in this position as shown in Fig. 8 until the escape wheel 43 has made a complete rotation or until the pin 72 again engages the rod 71 which again moves the rod 73 downward until lock block 76 is again directly opposite to loop 23 of the arm 22 as shown in the open position in Fig. 3. Now the object of moving the lock block 76 in front of the upper part of loop 23 is to prevent the alternating current circuit being closed at all out-lying stations, such as the station 4, when a call has been made, or in other words it prevents the closing of the alternating circuit at the station 4 when the line is "busy" that is when station 3 is talking with station 5, even though the arm 11 is turned around at station 4, for if it were possible for a subscriber at an outlying station, such as station 4, to close the alternating current circuit while the line is "busy" it would then be possible for such party to interfere with a conversation by operating the generator, thus opening the talking circuit and disconnecting the parties at the sending and receiving stations. When the line is "busy" and when the locking block 76 is in front of the upper half of loop 23, it also prevents the bell circuit being closed at switch 84 and pin 83 even though the arm 11 be turned around at cut station 4, for if it were possible to close the bell circuit at a cut out station when the line is "busy", the bell would ring and this might cause an annoyance to the subscriber at station 4 should he make a mistake and turn the arm 11 around by operating the thumb wheel $3^a$ when the line is "busy" because there is no way for him to return the arm 11 when the line is busy. However, if arm 11 is turned around when the line is "busy" it will do no harm for it will return to open position again when the line is cleared. In other words, a party at the cut out station 4, cannot close this alternating current circuit when the line is "busy" and if he should accidentally turn the thumb wheel $3^a$ to move the arm 11 at his station 4, the arm will be moved back to normal open position when the party at sending station 3 clears the line.

Figure 15:
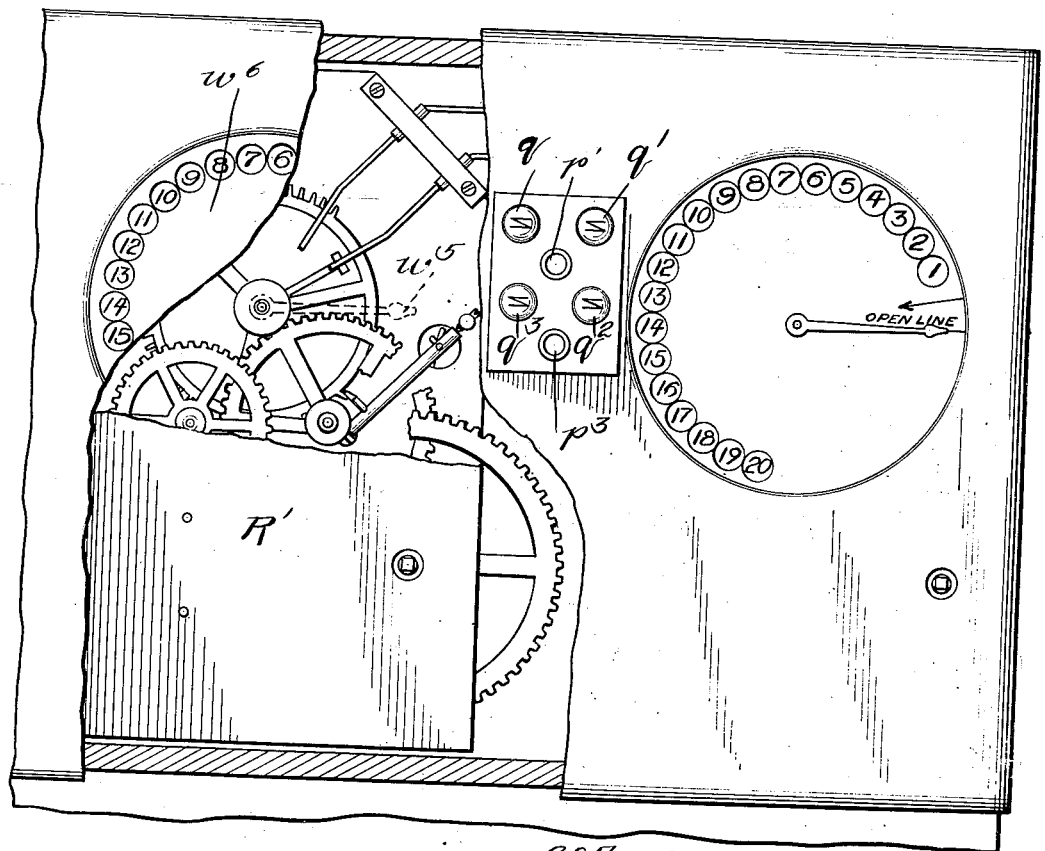
Fig. 15 is a view partly in front elevation and partly in section of a portion of a central station and showing parts of the receiving mechanism of a selecting apparatus at the central station, as well as the arrangement of the signal lights at the station.
Figure 16:
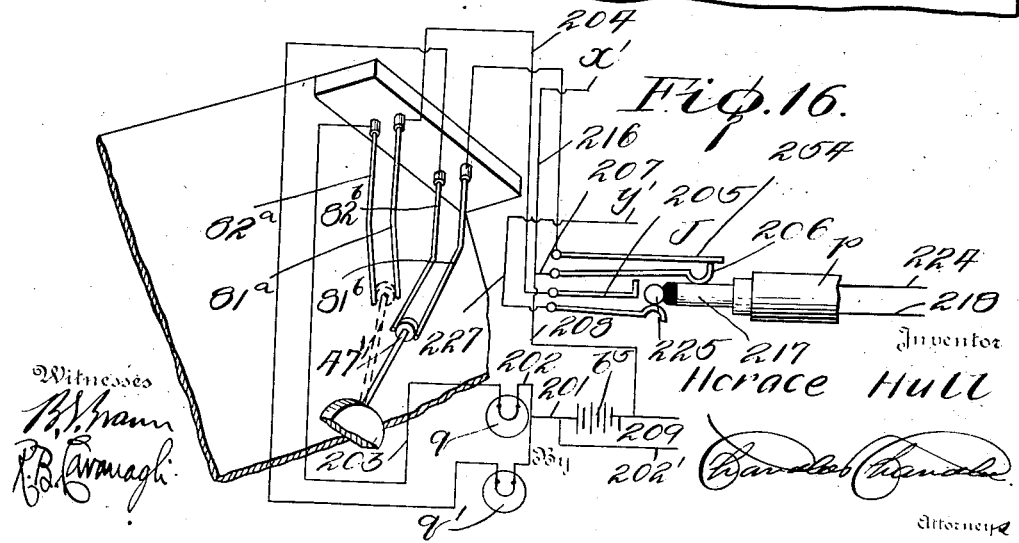
Fig. 16 is a detail diagrammatic view further illustrating a portion of the apparatus and the signal light circuits at the central station.

*The central system.*—In Figs. 2, 15, 16 and 17, I have shown my invention as embodied in a selective telephone system employing a central station. In this case the central station, in addition to having the usual equipment, such as plugs, jacks and the like, is provided with one of my receiving mechanisms for each line that goes into the central station, while such central office employs but one of my sending mechanisms, as shown in Fig. 17, which is common to all of the lines leading to the central station. For instance, if there are twenty lines leading to the central station, the latter is provided with twenty of the receiving mechanisms, one for each line, while one central sending mechanism serves for the entire twenty lines. By reference to the drawings, and especially to Fig. 2, it will be seen that I have shown a system wherein the two stations K and L, which are the subscribers' stations, are connected with the central office P. It is to be understood that each of the subscribers' stations K and L has a selecting apparatus or equipment similar to that described heretofore for the stations 3, 4 and 5. Furthermore, the receiving mechanism at the end of each line of the central station is substantially similar to the subscribers' receiving mechanism heretofore described in detail, and the sending mechanism at the central station is also substantially similar in construction to the sending mechanism heretofore described for the subscribers' stations, so that it will be unnecessary in the central station system to go into a detailed description of the structural features of the receiving mechanism and sending mechanism of the central station. Now, assuming that the subscriber at station K on one circuit or line desires to communicate with the subscriber at station L on a different circuit or line, this, of course, must be done through the central station, and the operation proceeds as will be described. We will further assume that the call number of station K is "7", while the call number of station L is "10", and that central's call number is "1". The calling party at station K now proceeds in substantially the same manner as described heretofore, that is to say, lifts the receiver from the hook, and turns his thumb wheel $3^a$ to move the indicator hand $v$ to central's number "1", and then turns the crank handle "$g$" of his generator to send the alternating current over the now closed alternating current circuit to the receiving mechanism in the central station, thereby moving the indicating hand $w^5$ at the central station to the number "1" on the receiving dial $w^6$ at the central station. At the central station I preferably employ lamps instead of bells to signal central, and in the case just mentioned, when the party at K calls the central station, the lamp $q$ is lighted, preferably showing a white light to notify the central operator that she has been called. This lamp is lighted because the local battery circuit is closed or completed as follows: When the generator handle $g'$ was turned by the calling party at station K, the contact pin 47' at the central station was moved into circuit closing position between the contact plates $81^a$ and $82^a$, as shown in dotted lines in Fig. 2. Therefore, the battery current from the central local battery $b^5$ which is preferably a gravity battery, passes through the conductor 200 to the conductor 201, thence through a portion of the conductor 202, through the lamp $q$, to the conductor 203, thence to the contact plate $82^a$, through the head of the pin 47' to the contact plate $81^a$, thence to the conductor 204 to the short leaf 205 of the jack J, which leaf 205 contacts with the sleeve leaf 206 at this time, because the plug is not in the jack. The current flows through this leaf 206 to the conductor 207, thence to the conductor 208 and conductor 209 back to the battery $b^5$, thus completing the local battery circuit and lighting the lamp $q$. Now, when central sees the white light, she places the plug $p$ in the hole $p'$, the plug entering the jack J, as shown in Fig. 16, thereupon moving the sleeve leaf 206 out of contact with the short sleeve 205, and in contact with leaf 254, thereby opening or breaking the circuit to lamp $q$. The central operator now grasps the usual operating key $k$ and presses it to listening position or between leaves 210 and 211, thus pressing these leaves 210 and 211 outward against the contact points 212 and 213 carried by the leaves 214 and 215 respectively. The talking circuit between the station K and the central station P is now completed because the pin 46 at the station K has been moved to circuit closing position between the contact plates 81 and 82 at that station as heretofore described. The talking circuit at the subscriber's station K is, therefore, closed, the current flowing from the subscriber's station to the line $x'$ through the various conducting wires at the station K, as heretofore described, the wire 113 carrying the current to the line $x'$. The current passing on the line $x'$ from the station K on reaching the central station passes down the conductor 216 to the sleeve leaf 206, over the sleeve leaf 206 to the sleeve 217 of the plug $p$, thence to the conductor 218 and through the condenser $c'$ to the conductor 219, and thence through the leaf 211, contact point 213, leaf 215, and conductor 220 to the central station receiver $r'$, thence through the conductor 221 to the secondary winding 222 of the induction coil $i'$, thence to the conductor 223, to the leaf 214, contact pin 212, leaf 210, conductor 224, to the tip 225 of the plug $p$. From the tip of the plug the current passes to the tip leaf 226 of the jack J, to the wire 227 back to the return line $y'$ and so on back to the station K where it follows the return conductors of this station as heretofore mentioned. The usual transmitter circuit of the central office leads from the ordinary gravity battery $b^5$ through the conductor 200, conductor 201, to the line 202', thence through the transmitter $t'$, conductor 203 to the primary winding 204 of the induction coil $i'$, thence through conductor 209 back to the battery $b^5$. This primary or transmitter circuit is employed as usual to enable the central operator to talk with a party calling.

It will now be noted that the central operator and the party at the calling station K may converse and the party at such calling station may, for example, tell the central operator that he desires to call the station L, on another line, giving central the call number "10" of this station. On receiving this call number "10" the central operator inserts the plug $p^2$ through the hole $p^3$ and into the jack J', the plug separating the sleeve leaf 230 from the short leaf 231, moving the end of the sleeve leaf 230 against the leaf 232. The central operator now turns the thumb wheel 3' of the sending mechanism S', thus moving the hand of the sending mechanism S', to the number "10" on the dial thereof, that is to say to the number the subscriber desired. The central operator now grasps the operating key $k$ and pulls it to the "ringing side," or the side connecting the alternating current, the key $k$ now coming into contact with the leaves 233 and 234, pressing these leaves 233 and 234 outward into contact with the ends of the leaves 235 and 236 respectively, and breaking the contact between the leaves 233 and 234 and the leaves 237 and 238 respectively. The generator or alternating current circuit is now closed and upon the operation of the crank $g^2$ of the central station generator $g^3$ the alternating current will flow from the generator $g^3$ along the conductor 239 to the contact point 26' which is now in contact with the switch 25', the current passes through this switch 25' along the conductor 240 to the outside leaf 236, thence to the leaf 234 to the conductor 241, to the sleeve 242 of the plug $p^2$, thence to the sleeve leaf 230 of the jack J' in which the plug is inserted, to the conductor 244, to the line $x^2$ and then a portion of the current is shunted down the line 113' to the coils 94 at the station L, at which station the current operates the receiving mechanism of the selector apparatus of this station L, as heretofore described, for the purpose of placing the pin 47 between the contact plates 81 and 82, as shown in dotted lines in Fig. 2, thereby connecting up the telephone at the station L by closing the talking circuit and local battery or bell circuit. The alternating current passes from the station L as before described, through the conductor 116 to the return wire $y^2$ to the central station P, and at the central station it passes down the conductor 245 to the tip leaf 246, plug tip 247, conductor 248, connected with the plug $p^2$, to the contact leaf 233, thence to the leaf 235, to the conductor 249 and so on back to the generator $g^3$ from which it started. In the central station a pair of alternating coils $94^a$ are bridged across the generator or alternating current circuit by conductors $94^b$, and by reference to Fig. 2, it will be seen that the conductors $94^b$ are bridged into the generator or alternating current circuit at the conductors 248 and 241, which connect with the leaf contacts 233 and 234 so that the coils $94^a$ are in the closed alternating current circuit when the key $k$ is pulled by the operator to the ringing side of the key, as will be readily understood. These coils $94^a$ are for the purpose of actuating the escapement mechanism of the sending mechanism S' at the central station when the alternating current circuit is closed, and such coils $94^a$ can only be operated by the generator $g^3$ owing to the manner in which they are bridged into the operating key of the central switch board. The parties at the stations K and L, although on two different lines, may now converse, as the talking circuit is closed through the central station, and this talking circuit from the station K to the station L, through the central station P, may be traced as follows, it being only necessary to trace the talking circuit from the points where the talking circuit conductors of the two stations join the main circuits, as the internal talking circuits of each subscriber's station has already been described and traced. From the station K the current passes through the conductor 113 along the line $x'$ to the conductor 216 at the central station, then through the leaf 206 of the jack J to the sleeve 217 of the plug $p$, thence through the conductor 218, condenser $c'$, conductor 219, contact leaf 211 of the key $k$, conductor 250 to the leaf contact 238, thence to the leaf contact 234, down the latter to the conductor 241, to the sleeve 242 of the plug $p^2$, to the sleeve leaf 230 and along the conductor 244 to the line $x^2$ leading to the station L and thence through the conductor 113' to this station. The current then passes through this station L, as before described and to the return $y^2$ through the conductor 116. From the return $y^2$, the current goes back to and through the central station by means of the conductor 245, tip leaf 246, tip 247 of the plug $p^2$, conductor 248 connected with the tip of the plug, contact leaf 233, contact leaf 237 to the conductor 251, thence to leaf contact 210, conductor 224, plug tip 225, tip leaf 226 of the jack J and conductor 227 to the return $y'$ of the station K.

While this talking circuit is closed and the two parties from stations K and L are conversing with the receivers removed, of course, the local battery circuits for both the central and subscribers' stations are open so that the signals are dead while the conversation is in progress. When the parties have finished their conversation, the party at the calling station K clears the line in the manner heretofore described, by turning the thumb wheel $3^a$ completely around to the "ring off" point shown in Fig. 14, and then operating the generator at station K to bring the indicator hands of the receiving mechanism of the stations on the line, including the central station, to their normal positions to "open line". The act of the subscriber at the sending station in clearing the line also turns the pin 47' at the central station from the position shown in dotted lines between the contacts $81^a$ and $82^a$ anti-clockwise to the position shown in full lines in Fig. 2, thus bridging the pair of contact plates $81^b$ and $82^b$. In this latter position, a local battery circuit is closed from the battery $b^5$ to the red lamp $q'$ lighting this lamp and notifying the central operator that the parties at K and L have finished using the line. Of course, the plug $p$ at this time still is in the jack J. The circuit from the battery $b^5$ through the lamp $d$ is as follows: From the battery $b^5$ the current passes through the conductor 200, conductor 201, portion of conductor 202, through the red lamp $q'$, conductor 252 to the contact plate $82^b$, through the head of the pin 47' to contact plate $81^b$, to conductor 253 to the jack leaf 254, thence through the sleeve leaf 206 and conductor 207, to conductor 208, conductor 209 back to the battery $b^5$ thus completing the circuit and lighting the red lamp $q'$. The central operator may now clear the line of the station L and all other stations on the same circuit with station L by turning the thumb wheel of the sending apparatus at the central office to the "ring off" position of the indicator, and then operating the generator to return the indicating hand of the receiving mechanisms of the line as well as the indicating hand at the central sending mechanism to "open line" position. This act of clearing the line turns the contact pin 46' of the central sending apparatus from the position shown in dotted lines in Fig. 2 to contacting position between the contact plates $81^d$ and $82^d$. The result is that a circuit to the red lamp $q^2$ is closed and gives notice to central that the circuit or line of the station L has been properly cleared. This circuit to the lamp $q^2$ leads from the battery $b^5$ to the conductor 200, portion of conductor 201, portion of conductor 255, through the lamp $q^2$, through conductor 256, contact plate $81^d$, head of pin 46', contact plate $82^d$, conductor 257, leaf 232 of the jack J', sleeve leaf 230 of this jack, section of conductor 207, conductor 208, conductor 209, back to the battery $b^5$. When this red lamp $q^2$ is lighted, the central operator noting that the light has been lighted, may now withdraw both the plugs $p$ and $p^2$. Of course, the instant the central operator withdraws the two plugs $p$ and $p^2$, the local battery circuits through the red lamps $q$ and $q^2$ are broken at the jacks J and J' and the lights are extinguished and the lines are at normal or open position ready for the next call.

It will be noted that the contact plates $81^c$ and $82^c$ and their associated parts are brought into use when the calling operation is reversed, that is when party at station L calls party at station K, the operation being precisely the same as that described for station K calling station L.

In Fig. 16 I have diagrammatically shown one of the plugs, in the present instance, the plug $p$, in its jack J, and in this instance the local battery circuit to the red lamp $q'$ is closed, lighting the red lamp.

In Fig. 15 I have shown a light $q^3$ which it will be understood is the calling light at central of the station L, and this light is connected in the local battery circuit identically the same as described for the white light $q$. It is, of course, used when the party L would be calling the party K, instead of the party K calling L, as described.

In Fig. 15 of the drawings I have shown certain parts of the receiving mechanism R' of the central station and while in this view certain of the parts are shown as set at an angle, this is merely for the purpose of economy of space. Structurally the parts going to make up the receiving mechanism at the central station are identical with the corresponding parts used in the receiving mechanism of the subscribers' stations. However, from the receiving mechanism R' of the central station I omit certain parts or elements, such as the locking wire 73 and the flange 70, arm 71 and pins 72 and 80 on the escape wheel 43. I also use but one contact pin for the escape wheel 43 and two sets of contact plates therefor at the central receiving mechanism instead of two contact pins and one set of contact plates as is used at the subscribers' stations. Furthermore, in the central station apparatus I omit the latching rod 78 and the sliding rod 97 actuated by the push button 99, as well as the battery contact switch 84 of the bell circuit. I omit these parts which relate to the mechanism for locking out a party from the line for the reason that it is not desired to lock out the central station from the system as the central operator must be able to connect in and out of the system at any time to properly govern the line in course of her duties. In other words, the central operator must be able to connect in and out of the line at any time by the mere actuation of her operating key $k$, or by proper manipulation at the switch-board.

From the above description, taken in connection with the drawings, the construction and operation of my system, either when used in connection with one main line having a plurality of stations thereon, and including the central station, or when used in connection with different lines, will be readily understood to those skilled in the art.

A particularly advantageous feature of my invention is its adaptability for long distance work, especially in rural regions where it is desired to connect a comparatively large number of stations into a single circuit or on one line. The invention permits of a great number of stations, for instance twenty or more, to be connected in multiple in one circuit, because the alternating current of high voltage and low amperage may be employed.

It will also be noted that with my system, any party on the line may call and converse with any other party on the same line without going through the central office, and without allowing other subscribers on the same line, unless wanted, to cut into the circuit. In other words, when two parties on the same line are conversing all other parties on that line may be automatically locked out. However, as before stated, if necessary, any other party on the same line may be called and placed in the circuit at the will of the party at the sending or calling station. Furthermore, a party at a calling or sending station may in an emergency, such for instance in the case of fire, place all of the parties on his line in the circuit, by simply operating his sending mechanism to move the pin 46 of all the stations into contact with their adjacent contact plates 81 and 82. In Fig. 14 of the drawings the point on the sending indicator to which the party calling moves the hand $v$ to call all parties on the same line is marked "0" and "fire," the hand $v$ moving just one step to move the pins 46 of all the stations on the line into their contacts as mentioned. The hand $w$ at the receiving mechanisms of all of the other stations would, of course, move it one step to the point marked "Ring off" and at the same time the signal bells of all of these stations would, of course, be sounded.

Another advantage incident to my invention is that I provide for a continuous signaling at a receiving station. That is to say, when a station has been called the bell at such station will ring continuously until a person at such station lifts the receiver from the hook to break the local battery circuit. In case no response should be made from the called or receiving station, the party calling may, after waiting a reasonable length of time, clear the line as before described, knowing from failure to receive a response that no one was attending the receiving station, the clearing of the line, of course, stopping the ringing of the bell at the receiving station. It will also be seen that a party at a sending station cannot fail to clear the line without receiving notice of the fact, for until such sending party moves the sending indicator hand $v$ entirely around to "ring off" position and then operates his generator to bring such hand $v$ back to "open line" position, the bell at such sending station will ring should such party at the sending station hang up his receiver without performing this clearing operation.

Another important advantage incident to my system is that I employ the same line or circuit for both the selecting circuit and talking circuit, and in addition to this I employ merely local battery circuits for operating the signal bells or the signal lights at the stations. That is to say the current for operating the bells or lights does not pass over the main line and its return, but is confined merely to the local circuits at the station.

Where my system embodies a central station, it also possesses manifest advantages. One is that at the central station the ordinary central equipment may be employed and my invention may be applied thereto without making any radical changes in this central equipment, as in installing my apparatus at the central station, it is only necessary to bridge the same into the main circuit by a few "jumper" or bridge wires.

It is also to be noted that where the central station is employed, the central operator can clear any line at any time by merely operating the sending mechanism at the central station. This is important, for should a party hold a line in use an unreasonably long time, or should the selector apparatus at any one station be put out of step or synchronism with the other stations by lightning or other causes, the central operator may step all the stations into synchronism again by merely operating the sending mechanism at the central station to clear the line. This frequently saves the necessity of an electrician being sent out on the line to find the trouble.

It will further be seen that when the system employs a central station, it is not necessary for the central operator to listen on the line to ascertain when the conversation is finished as the act of the sender at the subscriber's station in clearing the line will operate the receiving mechanism of such line at the central station to indicate that the conversation is completed, because at the central station the hand $w^5$ will be brought back to the position "open line" and the plug being in at the central station, the red light will be lighted to indicate that the line is no longer in use.

Furthermore, it is not necessary when using my system for the central operator to ring a subscriber several times, as the bell at the subscriber's station, when once connected into the local battery circuit by the central operator, will ring continuously until the receiver of such subscriber's station is lifted from the hook.

It will also be noted that with my system the use of the code signaling or ringing at the subscribers' stations is avoided, and no signal is given excepting at the station called, thus saving the subscribers at stations not wanted the annoyance of having the bells ring.

It will further be seen that in the construction of my selector apparatus, I employ impedance coils which are connected in multiple with the main circuit and operate by an alternating current so that the use of direct current on the line is avoided, thus providing the selector apparatus which will operate on a ground return circuit.

Furthermore, with my invention the use of relays in the selecting system is entirely avoided.

There are numerous other advantages incident to my invention which will be readily apparent to those skilled in this particular art.

It is to be noted that while I have herein shown and described by way of illustration an alternating current generator in the nature of a magneto, it is to be understood that any mechanism or apparatus for generating an alternating current of proper frequency and potential may be employed for this purpose.

While I have herein shown and described one particular embodiment of my invention, I wish it to be understood that I do not limit myself to all the precise details of construction herein set forth by way of illustration, as modification and variation may be made

What I claim is:

1. The combination with a main circuit, a plurality of stations connected in multiple therewith, a switch operated at one of said stations by a predetermined number of cycles of an alternating circuit, and means predetermining the cycles of alternating current to be passed over the circuit, said sending and receiving mechanism of each station being operated by means common to both.

2. The combination with a main circuit, a plurality of stations connected in multiple therewith, means at each station to receive a predetermined number of cycles of an alternating current to call said station, means provided at each station for sending out a predetermined number of cycles of alternating currents to call any one of said stations, and means common to both the sending and receiving means for the operation thereof.

3. In a telephone system, a main circuit, a plurality of stations connected in multiple therewith, means at each station to receive a predetermined number of cycles of alternating current to call said station, and means at each station for passing over the circuit a current of proper number of cycles to operate the receiving mechanism of the desired station.

4. In a telephone system, a main circuit, a plurality of stations connected in multiple therewith, means at each station to receive a predetermined number of cycles of alternating current to call said station, means at each station for generating an alternating current passed through the main circuit.

5. The combination with a main circuit, of a plurality of selecting apparatuses having impedance coils connected in multiple with the main circuit, each apparatus including a sending mechanism and a receiving mechanism, and means including a source of alternating current for energizing the impedance coils and thus actuating the sending mechanism of one selecting apparatus to correspondingly actuate the receiving mechanism of another selecting apparatus.

6. In a telephone system, a main circuit, a plurality of stations connected in multiple with said circuit, and each adapted to be operated by a predetermined number of cycles of alternating current, and means at each station for controlling the number of cycles of alternating current sent out by said station for the purpose of calling any one of the desired stations.

7. In a telephone system, a main circuit, a plurality of stations connected in multiple therewith, mechanism at each station operated by a predetermined number of cycles of alternating circuit, and means at each station for sending over the circuit the necessary cycles of alternating current to operate the mechanism of any of the desired stations.

8. In a signaling system, the combination with the main circuit, a sending station and a receiving station, of a selector for the sending station including a sending mechanism, impedance coils and controlling devices therefor, a selector for the receiving station including a receiving mechanism, impedance coils and controlling devices therefor, and a source of alternating current adapted to energize the coils at the sending station to impart a predetermined number of movements to the controlling device of the sending mechanism to operate the latter and correspondingly actuate the controlling devices of the receiving mechanism at the receiving station.

9. In a selecting apparatus for signaling systems, a sending mechanism including a switch adapted to open and close an alternating current circuit, devices including impedance coils for operating the switch to open the circuit at predetermined times, and means for energizing said coils when the alternating current circuit is closed to operate the switch.

10. A signaling system selecting apparatus including a sending mechanism, receiving mechanism, an escapement device controlling both the sending mechanism and the receiving mechanism, and alternating current coils adapted when energized to operate the escapement device.

11. In a signaling system selecting apparatus, the combination with a main circuit of a sending mechanism, a receiving mechanism, alternating current coils bridged across the main circuit, adapted when energized, to actuate both of said mechanisms, and means for simultaneously energizing the alternating current coils.

12. In a signaling system selecting apparatus, the combination of sending mechanism including an escape wheel, receiving mechanism including an escape wheel, a device for controlling the step by step rotation of both escape wheels, and alternating current coils adapted when energized to actuate said device.

13. In a signaling system selecting apparatus, a sending mechanism including a shaft having an escape wheel loose thereon, a member carried by the shaft, a dog carried by the member and engageable with the escape wheel, a circuit closing switch normally held in open position by said member, means for rotating the shaft to move said member to permit the closing of the switch to close the circuit, and means including alternating current devices adapted when the circuit is closed to rotate the shaft in the opposite direction to return said member to its normal switch opening position.

14. In a signaling system selecting apparatus, a sending mechanism comprising a shaft, a member rotatable with the shaft, a circuit closing switch normally held in open position by said member, means for moving said member away from the switch to permit the closing of the circuit and means including polarized or impedance coils energized by an alternating current when said circuit is closed to rotate the shaft and return said member to its normal switch opening position.

15. In a selecting apparatus, a plurality of shafts, an escape wheel supported on each shaft, an operative connection between the escape wheels, means for rotating the shafts, a pin carried by one of said shafts, a pair of contact members adapted to be engaged by the pin to close an electric circuit, a contact member, a switch member adapted to engage the contact member, and means carried by one shaft adapted to move the switch from engagement with the contact member.

16. A selecting apparatus, the combination with a plurality of shafts, and means for rotating the shafts, of locking means for holding the shafts against rotation, means for operating the locking members to permit the rotation of the shafts, a circuit closing switch, an arm carried by one of said shafts, a spring tensioned rod disposed in the path of the arm and adapted when contacted with by such arm to hold the switch in open position, a pair of stationary contact members carried by one of the shafts and adapted to rotate with the latter to contact with the stationary contact members at predetermined times, a locking rod arranged to engage with the spring pressed rod, and a traveling pin adapted to operate the locking rod.

17. In a signaling system, the combination with a main circuit, a sending station and a plurality of receiving stations, all of said stations being connected in multiple with the main circuit, a selecting apparatus for the sending station, a selecting apparatus for each of the receiving stations, means including a source of alternating current for operating the selecting apparatus of the sending station to operate the selecting apparatus of one of the receiving stations, and means for maintaining the selecting apparatus of said receiving station in operation while a second receiving station is placed in operative relation with the main circuit from the sending station.

18. In a signaling system, the combination with a plurality of main circuits and a central station, of a plurality of subscribers' stations having polarized coils connected in multiple with each main circuit, selecting mechanism including a sending apparatus and a receiving apparatus for each subscriber's station, a receiving apparatus for each subscriber's station located at the central station, and a sending apparatus at the central station common to all of the subscribers' stations.

19. In a signaling system, the combination with a plurality of main circuits and a central station, of a plurality of subscribers' stations connected in multiple with each main station, each subscriber's station having a selecting apparatus including a sending mechanism and a receiving mechanism, and means including a source of alternating current for operating the sending mechanism, a receiving apparatus for each subscriber's station located at the central station, a sending mechanism at the central station common to all of the subscribers' stations, and means including a source of alternating current for operating the sending apparatus at the central station.

20. In a selective signaling system, the combination with a main circuit, a plurality of signal stations having polarized impedance coils connected in multiple with the main circuit, a selecting apparatus for each station, said apparatus including a sending mechanism and a receiving mechanism, means including a source of alternating current for energizing the coils, and thus operating the sending mechanism of a station to correspondingly actuate the receiving mechanism of a desired station, and means for locking out all stations on the circuit other than the selected station.

21. The combination with a main circuit, a plurality of stations connected in multiple therewith, each station containing means for predetermining the cycles of alternating current to be passed over the circuit and means at each station to receive a predetermined number of cycles of alternating current to correspondingly close a switch at a desired station, the sending and receiving mechanism of each station being operable by impedance coils common to both.

In testimony whereof, I affix my signature, in the presence of two witnesses.

HORACE HULL.

Witnesses:
R. B. CAVANAGH,
M. E. HARTLEY.